United States Patent
Suzuki et al.

(10) Patent No.: US 11,650,588 B2
(45) Date of Patent: *May 16, 2023

(54) VEHICLE

(71) Applicant: TOYOTA JIDOSHA KABUSHIKI KAISHA, Toyota (JP)

(72) Inventors: Ikuma Suzuki, Okazaki (JP); Yuta Ohashi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/722,673

(22) Filed: Apr. 18, 2022

(65) Prior Publication Data
US 2022/0244733 A1 Aug. 4, 2022

Related U.S. Application Data

(63) Continuation of application No. 17/154,106, filed on Jan. 21, 2021.

(30) Foreign Application Priority Data

Jan. 31, 2020 (JP) .............................. JP2020-015721

(51) Int. Cl.
*G05D 1/02* (2020.01)
*B60W 60/00* (2020.01)
*B60Q 1/34* (2006.01)

(52) U.S. Cl.
CPC ......... *G05D 1/0212* (2013.01); *B60W 60/001* (2020.02); *B60Q 1/34* (2013.01);
(Continued)

(58) Field of Classification Search
CPC .............. G05D 1/0212; B60W 60/001; B60W 2520/04; B60W 2520/06; B60W 2520/28; B60Q 1/34
See application file for complete search history.

(56) References Cited

U.S. PATENT DOCUMENTS 8,965,691 B1 2/2015 Lombrozo
2009/0295376 A1 12/2009 Vu et al.
(Continued)

FOREIGN PATENT DOCUMENTS

EP 1 470 017 A 10/2004
JP 2003-089350 3/2003
(Continued)

OTHER PUBLICATIONS

Office Action dated Dec. 9, 2022 in U.S. Appl. No. 17/154,106.

*Primary Examiner* — Rodney A Butler
(74) *Attorney, Agent, or Firm* — Oblon, McClelland, Maier & Neustadt, L.L.P.

(57) ABSTRACT

When a vehicle control interface receives information indicating "Standstill" from a VP, the vehicle control interface sets a value 2 in a signal indicating an actual moving direction. When the number of wheels rotating in a forward rotation direction is larger than two, the vehicle control interface sets a value 0 in the signal indicating the actual moving direction. When the number of wheels rotating in a reverse rotation direction is larger than two, the vehicle control interface sets a value 1 in the signal indicating the actual moving direction. When the number of wheels rotating in the forward rotation direction is equal to the number of wheels rotating in the reverse rotation direction, the vehicle control interface sets a value 3 in the signal indicating the actual moving direction. The vehicle control interface provides the signal indicating the actual moving direction to an ADK.

12 Claims, 19 Drawing Sheets

(52) U.S. Cl.
CPC ..... *B60W 2520/04* (2013.01); *B60W 2520/06* (2013.01); *B60W 2520/28* (2013.01)

(56) References Cited

U.S. PATENT DOCUMENTS

| | | |
|---|---|---|
| 2010/0185361 A1 | 7/2010 | Irth et al. |
| 2014/0156157 A1 | 6/2014 | Johnson et al. |
| 2016/0167653 A1 | 6/2016 | Malone et al. |
| 2016/0377508 A1 | 12/2016 | Perrone et al. |
| 2019/0258253 A1 | 8/2019 | Tremblay |
| 2019/0279497 A1 | 9/2019 | Sekizawa et al. |
| 2020/0225668 A1* | 7/2020 | Masuda ............... G05D 1/0214 |
| 2020/0269855 A1 | 8/2020 | Hinterberger et al. |
| 2021/0078586 A1 | 3/2021 | Sakaguchi et al. |
| 2022/0084330 A1* | 3/2022 | Sakaguchi .............. G01P 13/04 |

FOREIGN PATENT DOCUMENTS

| | | |
|---|---|---|
| JP | 2017-178267 | 10/2017 |
| JP | 2018-132015 A | 8/2018 |
| WO | WO 03/059680 A1 | 7/2003 |
| WO | WO2010/137136 A1 | 12/2010 |

\* cited by examiner

FIG.3

| value | Description | remarks |
|---|---|---|
| 0 | Forward | |
| 1 | Reverse | |
| 2 | Standstill | |
| 3 | Undefined | |

FIG.8

| # | | Description |
|---|---|---|
| #1: CREATING A DRIVING PLAN | DRIVING PLAN | THE ADS CREATES A DRIVING PLAN. |
| #2: EXTRACTING PHYSICAL QUANTITIES | EXTRACTS PHYSICAL QUANTITIES / ACCLERATION vs TIME / ROAD WHEEL ANGLE vs TIME | THE ADS EXTRACTS PHYSICAL CONTROL QUANTITIES FROM THE DRIVING PLAN. E.G. PHYSICAL CONTROL QUANTITIES := ACCELERATION, ROAD WHEEL ANGLE, ETC. |
| #3: SPLIT OF PHYSICAL QUANTITIES | SPLITS PHYSICAL QUANTITIES / ACCLERATION vs TIME | THE ADS SPLITS THEM BY DEFINED CYCLE TIME OF EACH API. |
| #4: EXECUTION OF THE API WITH THE VALUE | EXECUTES THE API WITH THE VALUE / AUTOMATED DRIVING KIT / COMPUTER / API: ACCELERATION_REQUEST(-X) / VEHICLE CONTROL INTERFACE | THE ADS EXECUTES THE API WITH THE SPLIT PHYSICAL QUANTITY. |
| #5: CALCULATION OF ITS BEHAVIOR | CALCULATES THE BEHAVIOR / ACUTUAL BEHAVIOR | THE ADS CALCULATES THE VEHICLE BEHAVIOR, AND RECREATES A DRIVING PLAN THAT THE VEHICLE BEHAVIOR IS REFLECTED TO |

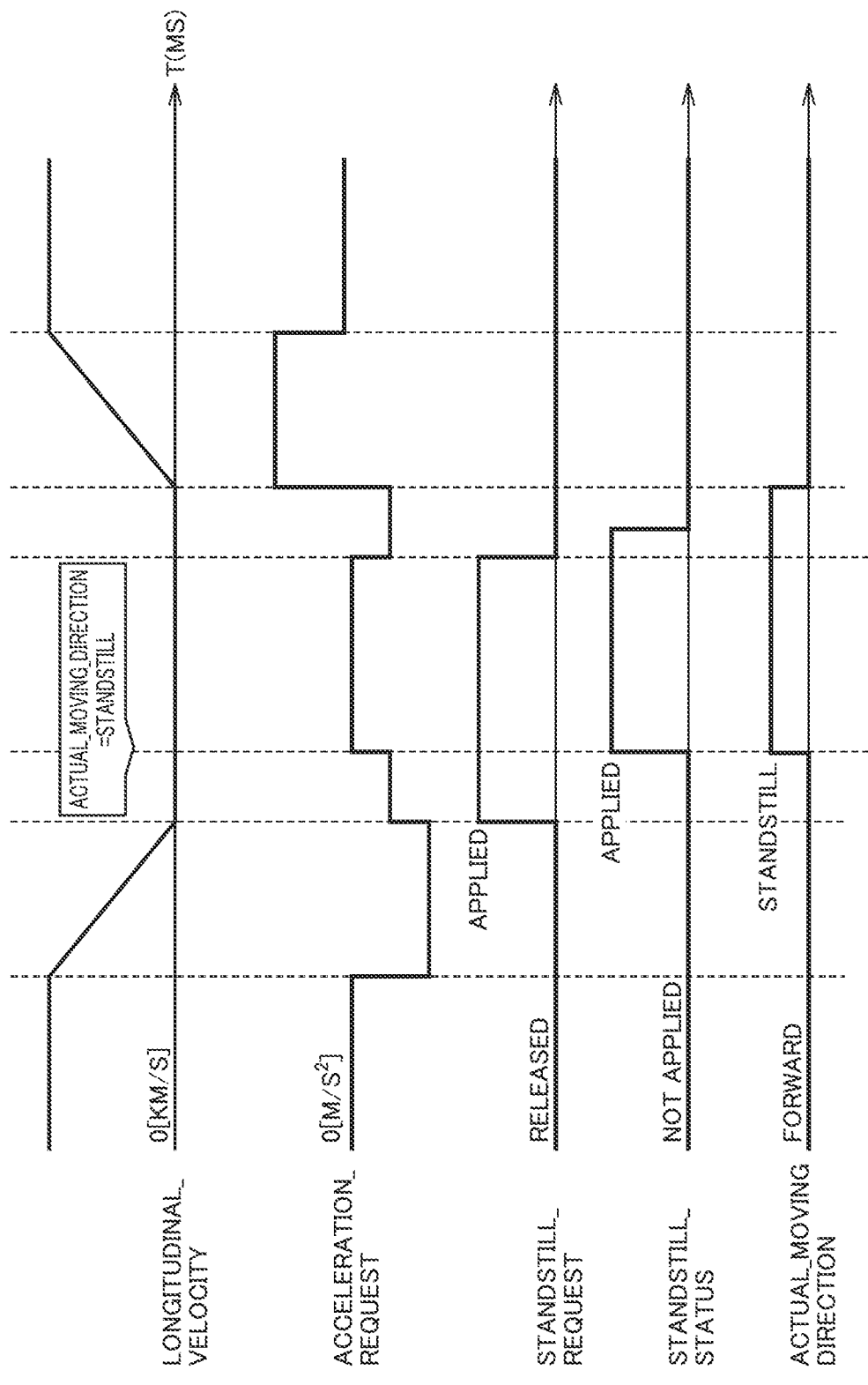

VEHICLE

This is a continuation of U.S. application Ser. No. 17/154,106, filed on Jan. 21, 2021, which is based on Japanese Patent Application No. 2020-015721 filed with the Japan Patent Office on Jan. 31, 2020, the entire contents of which are hereby incorporated by reference.

BACKGROUND

Field

The present disclosure relates to a vehicle capable of autonomous driving.

Description of the Background Art

A technique relating to autonomous driving of a vehicle has recently been developed. For example, Japanese Patent Laying-Open No. 2018-132015 discloses a vehicle including a motive power system that manages motive power of the vehicle in a centralized manner, a power supply system that manages supply of electric power to various vehicle-mounted devices in a centralized manner, and an autonomous driving system that carries out autonomous driving control of the vehicle in a centralized manner.

SUMMARY

The autonomous driving system may externally be attached to a vehicle main body. In this case, autonomous driving is carried out as the vehicle is controlled in accordance with an instruction from the autonomous driving system. In order to enhance accuracy in autonomous driving, a state of the vehicle is desirably appropriately provided (conveyed) to the autonomous driving system. A moving direction of the vehicle represents one of states of the vehicle.

The present disclosure was made to achieve the object above, and an object of the present disclosure is to appropriately provide, in a vehicle capable of autonomous driving, a signal indicating a moving direction of the vehicle from a vehicle main body to an autonomous driving system.

(1) A vehicle according to the present disclosure is a vehicle on which an autonomous driving system is mountable, and the vehicle includes a vehicle platform that controls the vehicle in accordance with an instruction from the autonomous driving system and a vehicle control interface that interfaces between the vehicle platform and the autonomous driving system. The vehicle control interface provides to the autonomous driving system, a signal indicating a moving direction of the vehicle that is determined in accordance with a rotation direction largest in number among rotation directions of wheels.

According to the configuration, the vehicle is provided with the vehicle control interface that interfaces between the vehicle platform and the autonomous driving system. A signal indicating, the determined moving direction of the vehicle can thus appropriately be provided to the autonomous driving system through the vehicle control interface. The moving direction of the vehicle is determined based on majority rule based on the rotation direction of the wheels.

(2) In one embodiment, when a certain time period has elapsed with a speed of all wheels being zero, the vehicle control interface provides to the autonomous driving system, a signal indicating "Standstill" as the signal indicating the moving direction of the vehicle.

According to the configuration, when a certain time period has elapsed with the speed of all wheels being zero, an appropriate signal indicating stop (the signal indicating "Standstill") can be provided to the autonomous driving system.

(3) In one embodiment, when the number of wheels rotating in a forward rotation direction is larger than the number of wheels rotating in a reverse rotation direction, the vehicle control interface provides a signal indicating "Forward" to the autonomous driving system, and when the number of wheels rotating in the reverse rotation direction is larger than the number of wheels rotating in the forward rotation direction, the vehicle control interface provides a signal indicating "Reverse" to the autonomous driving system.

According to the configuration, when the number of wheels rotating in the forward rotation direction is larger than the number of wheels rotating in the reverse rotation direction, an appropriate signal indicating forward travel (the signal indicating "Forward") can be provided to the autonomous driving system. When the number of wheels rotating in the reverse rotation direction is larger than the number of wheels rotating in the forward rotation direction, an appropriate signal indicating reverse travel (the signal indicating "Reverse") can be provided to the autonomous driving system.

(4) In one embodiment, when the number of wheels rotating in a forward rotation direction is equal to the number of wheels rotating in a reverse rotation direction, the vehicle control interface provides a signal indicating "Undefined" to the autonomous driving system.

According to the configuration, when the moving direction of the vehicle cannot be determined based on majority rule based on the rotation directions of the wheels, a signal to that effect (the signal indicating "Undefined") can be provided to the autonomous driving system.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 3 is a diagram for illustrating setting of a signal indicating an actual moving direction.

FIG. 8 is a diagram showing a typical flow in an autonomous driving system.

FIG. 9 is a diagram showing an exemplary timing chart of an API relating to stop and start of the MaaS vehicle.

DESCRIPTION OF THE PREFERRED EMBODIMENTS

Figure 1:
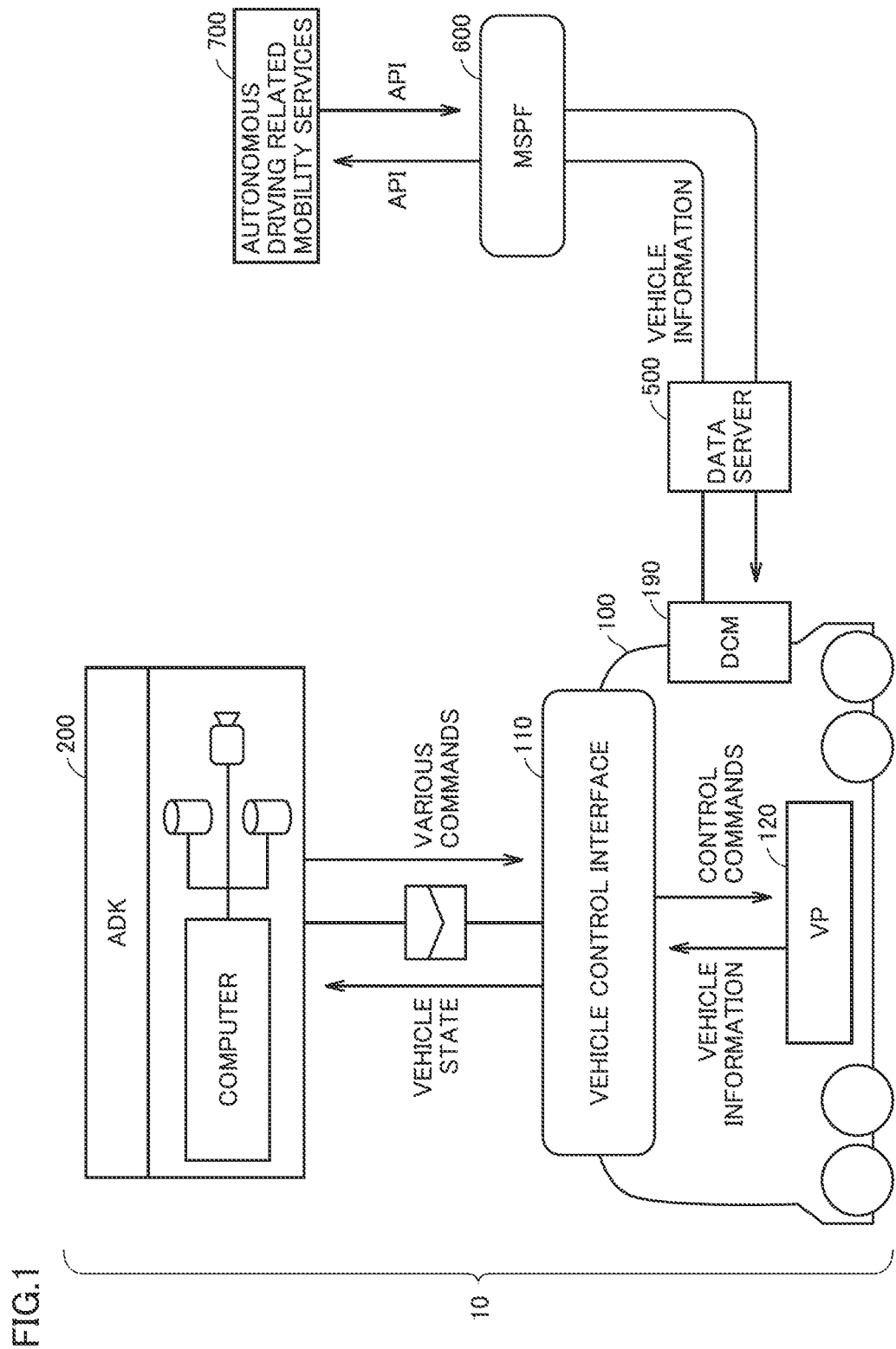
FIG. 1 is a diagram showing overview of a MaaS system in which a vehicle according to an embodiment of the present disclosure is used.

An embodiment of the present disclosure be described below in detail with reference to the drawings. The same or corresponding elements in the drawings have the same reference characters allotted and description thereof will not be repeated.

<Overall Configuration>

FIG. 1 is a diagram showing overview of a mobility as a service (Maas) system in which a vehicle according to an embodiment of the present disclosure is used.

Referring to FIG. 1, this MaaS system includes a vehicle 10, a data server 500, a mobility service platform (which is also referred to as "MSPF" below) 600, and autonomous driving related mobility services 700.

Vehicle 10 includes a vehicle main body 100 and an autonomous driving kit (which is also referred to as "ADK." below) 200. Vehicle main body 100 includes a vehicle control interface 110, a vehicle platform (Which is also referred to as "VP" below) 120, and a data communication module (DCM) 190.

Vehicle 10 can carry out autonomous driving in accordance with commands from ADK 200 attached to vehicle main body 100. Though FIG. 1 shows vehicle main body 100 and ADK 200 at positions distant from each other, ADK 200 is actually attached to a rooftop or the like of vehicle main body 100. ADK 200 can also be removed from vehicle main body 100. While ADK 200 is not attached, vehicle main body 100 can travel by manual driving by a user. In this case, VP 120 carries out travel control (travel control in accordance with an operation by a user) in a manual mode.

Vehicle control interface 110 can communicate with ADK. 200 over a controller area network (CAN) or Ethernet®. Vehicle control interface 110 receives various commands from ADK 200 by executing a prescribed application program interface (API) defined for each communicated signal. Vehicle control interface 110 provides a state of vehicle main body 100 to ADK 200 by executing a prescribed API defined for each communicated signal.

When vehicle control interface 110 receives a command from ADK 200, it outputs a control command corresponding to the command to VP 120. Vehicle control interface 110 obtains various types of information on vehicle main body 100 from VP 120 and outputs the state of vehicle main body 100 to ADK 200A configuration of vehicle control interface 110 will be described in detail later.

VP 120 includes various systems and various sensors for controlling vehicle main body 100. VP 120 carries out various types of vehicle control in accordance with a command given from ADK 200 through vehicle control interface 110. Namely, as VP 120 carries out various types of vehicle control in accordance with a command from ADK 200, autonomous driving of vehicle 10 is carried out. A configuration of VP 120 will also be described in detail later.

ADK 200 includes an autonomous driving system (which is also referred to as "ADS" below) fit autonomous driving of vehicle 10. ADK 200 creates, for example, a driving plan of vehicle 10 and outputs various commands for traveling vehicle 10 in accordance with the created driving plan to vehicle control interface 110 in accordance with the API defined for each command. ADK 200 receives various signals indicating states of vehicle main body 100 from vehicle control interface 110 in accordance with the API defined for each signal and has the received vehicle state reflected on creation of the driving plan. A configuration of ADK 200 (ADS) will also be described later.

DCM 190 includes a communication interface for vehicle main body 100 to wirelessly communicate with data server 500. DCM 190 outputs various types of vehicle information such as a speed, a position, or an autonomous driving state to data server 500 DCM 190 receives from autonomous driving related mobility services 700 through MSPF 600 and data server 500, for example, various types of data for management of travel of an autonomous driving vehicle including vehicle 10 by mobility services 700.

MSPF 600 is an integrated platform to which various mobility services are connected. In addition to autonomous driving related mobility services 700, not-shown various mobility services (for example, various mobility services provided by a ride-share company, a car-sharing company, an insurance company, a rent-a-car company, and a taxi company) are connected to MSPF 600. Various mobility services including mobility services 700 can use various functions provided by MSPF 600 by using APIs published on MSPF 600, depending on service contents.

Autonomous driving related mobility services 700 provide mobility services using an autonomous driving vehicle including vehicle 10. Mobility services 700 can obtain, for example, operation control data of vehicle 10 that communicates with data server 500 and/or information stored in data server 500 from MSPF 600, by using the APIs published on MSPF 600. Mobility services 700 transmit, for example, data for managing an autonomous driving vehicle including vehicle 10 to MSPF 600, by using the API.

MSPF 600 publishes APIs for using various types of data on vehicle states and vehicle control necessary for development of the ADS. An ADS provider can use as the APIs, the data on the vehicle states and vehicle control necessary for development of the ADS stored in data server 500.

<Configuration of Vehicle>

Figure 2:
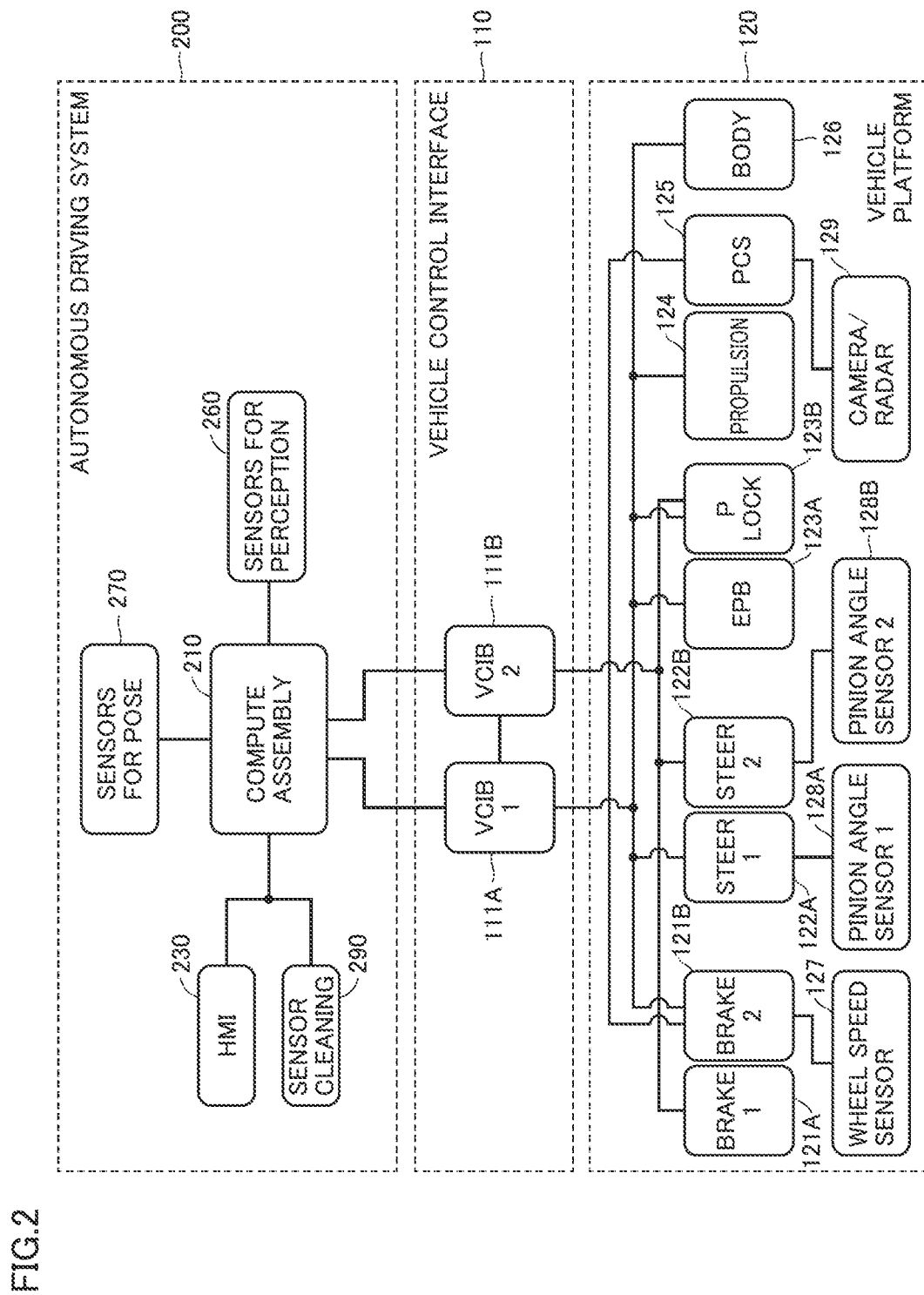
FIG. 2 is a diagram showing a detailed configuration of a vehicle control interface, a VP, and an ADK.

FIG. 2 is a diagram showing a detailed configuration of vehicle control interface 110, VP 120, and ADK 200. Referring to FIG. 2, ADK 200 includes a compute assembly 210, a human machine interface (HMI) 230, sensors for perception 260, sensors for pose 270, and a sensor cleaning 290.

During autonomous driving of vehicle 10, compute assembly 210 obtains information on an environment around the vehicle and a pose, a behavior, and a position of vehicle 10 with various sensors which will be described later. Compute assembly 210 obtains a state of vehicle 10 from VP 120 through vehicle control interface 110 and sets a next operation (acceleration, deceleration, or turning) of vehicle 10. Compute assembly 210 outputs various instructions for realizing a set next operation of vehicle 10 to vehicle control interface 110.

HMI 230 accepts an input operation from a user for vehicle 10. HMI 230 can accept, for example, an input by a touch operation onto a display screen and/or an audio input. HMI 230 presents information to a user of vehicle 10 by showing information on the display screen. HMI 230 may present information to the user of vehicle 10 by voice and sound in addition to or instead of representation of information on the display screen. HMI 230 provides information to the user and accepts an input operation, for example, daring autonomous driving, during manual driving by a user, or at the time of transition between autonomous driving and manual driving.

Sensors for perception 260 include sensors that perceive an environment around the vehicle, and are implemented, for example, by at least any of laser imaging detection and ranging (LIDAR), a millimeter-wave radar, and a camera.

The LIDAR measures a distance based on a time period from emission of pulsed laser beams (infrared rays) until return of the emitted beams reflected by an object. The millimeter-wave radar measures a distance and/or a direction to an Object by emitting radio waves short in wavelength to the object and detecting radio waves that are reflected and return from the object. The camera is arranged, for example, on a rear side of a Mom mirror in a compartment and shoots the front of vehicle 10. As a result of image processing onto images shot by the camera, another vehicle, an obstacle, or a human in front of vehicle 10 can be recognized. Information obtained by sensors for perception 260 is output to compute assembly 210.

Sensors for pose 270 detect a pose, a behavior, or a position of vehicle 10. Sensors for pose 270 include, for example, an inertial measurement unit (IMU) and a global positioning system (GPS).

The MU detects, for example, an acceleration in a front-rear direction, a lateral direction, and a vertical direction of vehicle 10 and an angular velocity in a roll direction, a pitch direction, and a yaw direction of vehicle 10. The UPS detects a position of vehicle 10 based on information received from a plurality of UPS satellites that orbit the Earth. Information obtained by sensors for pose 270 is output to compute assembly 210.

Sensor cleaning 290 can remove soiling attached to various sensors. Sensor cleaning 290 removes soiling on a lens of the camera or a portion from which laser beams and/or radio waves are emitted, for example, with a cleaning solution and/or a wiper.

Vehicle control interface 110 includes a vehicle control interface box (VCIB) 111A and a VCIB 111B. Each of VCIBs 111A and 111B includes an electronic control unit (ECU), and specifically contains a central processing unit (CPU) and a memory (a read only memory (ROM) and a random access memory (RAM)) (neither of which is shown). VCIB 111A and VCIB 111B are basically equivalent in function to each other. VCIB 111A and VCIB 111B are partially different from each other in a plurality of systems connected thereto that make up VP 120.

Each of VCIBs 111A and 111B is communicatively connected to compute assembly 210 of ADK 200 over the CAN or the like. VCIB 111A and VCIB 111B are communicatively connected to each other.

Each of VCIBs 111A and 111B relays various instructions from ADK 200 and provides them as control commands to VP 120. More specifically, each of VCIBs 111A and 111B executes a program stored in a memory, converts various instructions provided from ADK 200 into control commands to be used for control of each system of VP 120, and provides the converted control commands to a destination system. Each of VCIBs 111A and 111B processes or relays various types of vehicle information output from VP 120 and provides the vehicle information as a vehicle state to ADK 200.

For at least one of systems of VP 120 such as a brake system and a steering system, VCIBs 111A and 111B are configured to be equivalent in function to each other so that control systems between ADK 200 and VP 120 are redundant. Therefore, when some kind of failure occurs in a part of the system, the (Unction (turning or stopping) of VP 120 can be maintained by switching between the control systems as appropriate or disconnecting a control system where failure has occurred.

VP 120 includes brake systems 121A and 121B, steering systems 122A and 122B, an electric paring brake (EPB) system 123A, a P-Lock system 123B, a propulsion system 124, a pre-crash safety (PCS) system 125, and a body system 126.

Brake system 121B, steering system 122A, EPB system 123A, P-Lock system 123B, propulsion system 124, and body system 126 of the plurality of systems of VP 120 are communicatively connected to VCIB 111A through a communication bus.

Brake system 121A, steering system 122B, and P-Lock system 123B of the plurality of systems of VP 120 are communicatively connected to VCIB 111B through a communication bus.

Brake systems 121A and 121B can control a plurality of braking apparatuses (not shown) provided in wheels of vehicle 10. The braking apparatus includes, for example, a brake system that is operated with a hydraulic pressure regulated by an actuator. Brake system 121A and brake system 121B may be equivalent in function to each other. Alternatively, any one of brake systems 121A and 121B ma be able to independently control braking force of each wheel and the other thereof may be Able to control braking force such that equal braking force is generated in the wheels.

A wheel speed sensor 127 is connected to brake system 121B. Wheel speed sensor 127 is provided in each wheel of vehicle 10. Wheel speed sensor 127 detects a rotation speed and a rotation direction of a wheel. Wheel speed sensor 127 outputs the detected rotation speed and rotation direction of the wheel to brake system 121B. For example, wheel speed sensor 127 provides pulses different between during rotation in a direction of forward travel of vehicle 10 and during rotation in a direction of reverse travel of vehicle 10. Brake system 121B fixes or confirms the rotation direction of each wheel based on the pulses from wheel speed sensor 127. Then, brake system 121B provides information indicating the fixed rotation direction of each wheel to VCIB 111A.

Brake system 121B determines whether or not vehicle 10 has come to a standstill based on the fixed rotation direction of each wheel. Specifically, when the speed of all wheels is set to zero and when all (for example, four) wheel speed values are zero during a certain time period since the speed of all wheels was set to zero, brake system 1218 determines that vehicle 10 has come to a standstill. When brake system 1218 determines that vehicle 10 has come to a standstill, the brake system provides information indicating "Standstill" to VCIB 111A.

Each of brake systems 121A and 121B receives a command from ADK 200 as a control command through vehicle control interface 110 and generates a braking instruction to the braking apparatus in accordance with the control command. For example, brake systems 121A and 121B control the braking apparatus based on a braking instruction generated in one of brake systems 121A and 121B, and when a failure occurs in one of the brake systems, the braking apparatus is controlled based on a braking instruction generated in the other brake system.

Steering systems 122A and 122B can control steering angle of a stet, wheel of vehicle 10 with steering apparatus (not shown). The steering apparatus includes, example, rack-and-pinion electric: power steering (EPS) that allows adjustment of a steering angle by an actuator.

Steering systems 122A and 122B are equivalent in function to each other. Each of steering systems 122A and 122B receives a command from ADK 200 as a control command through vehicle control interface 110 and generates a steering instruction to the steering apparatus in accordance with the control command. For example, steering systems 122A and 122B control the steering apparatus based an the steering instruction generated in one of steering systems 122A and 122B, and when a failure occurs in one of the steering systems, the steering apparatus is controlled based on a steering instruction generated in the other steering system.

A pinion angle sensor 128A is connected to steering system 122A. A pinion angle sensor 128B is connected to steering system 132B. Each of pinion angle sensors 128A and 128B detects an angle of rotation (a pinion angle) of a pinion gear coupled to a rotation shaft of the actuator. Pinion angle sensors 128A and 128B output detected pinion angles to steering systems 122A and 122B, respectively.

EPB system 123A can control an EPB (not shown) provided in at least any of wheels. The EPB is provided separately from the braking apparatus, and fixes a wheel by an operation of an actuator. The EPB, for example, activates a drum brake for a parking, brake provided in at least one of wheels of vehicle 10 to fix the wheel. The EPB activates a braking apparatus to fix a wheel, to for example, with an actuator capable of regulating a hydraulic pressure to be supplied to the braking apparatus separately from brake systems 121A and 121B. EPB system 123A receives a command from ADK 200 as a control command through vehicle control interface 110 and controls the EPB in accordance with the control command.

P-Lock system 123B can control a P-Lock apparatus (not shown) provided in a transmission of vehicle 10. The P-Lock apparatus fixes rotation of an output shaft of the transmission by fitting a protrusion provided at a tip end of a parking lock pawl into a tooth of a gear (locking gear) provided as being coupled to a rotational element in the transmission. A position of the parking lock pawl is adjusted by an actuator. P-Lock system 123B receives a command from ADK 200 as a control command through vehicle control interface 110 and controls the P-Lock, apparatus in accordance with the control command.

Propulsion system 124 can switch a shift range with the use of a shift apparatus (not shown) and can control driving force of vehicle 10 in a direction of travel that is generated from a drive source (not Shown). The shift apparatus can select any of a plurality of shift ranges. The drive source includes, for example, a motor generator and/or an engine. Propulsion system 124 receives a command from ADK 200 as a control command through vehicle control interface 110 and controls the shift apparatus and the drive source in accordance with the control command.

PCS system 125 is communicatively connected to brake system 121B. PCS system 125 carries out control to avoid collision of vehicle 10 or to mitigate damage by using a result of detection b a camera/radar 129. For example, PCS system 125 detects an object in front and determines Whether or not vehicle 10 may collide with the object based on a distance to the object. When PCS system 125 determines that there is possibility of collision with the Object, it outputs a braking instruction to brake system 1218 so as to increase braking force.

Body system 126 controls, for example, various devices in accordance with a state or an environment of travel of vehicle 10. The various devices include, for example, a direction indicator, a headlight, a hazard light, a horn, a front wiper, and a rear wiper. Body system 126 receives a command from ADK 200 as a control command through vehicle control interface 110 and controls the various devices in accordance with the control command.

An operation apparatus that can manually be operated by a user for the braking apparatus, the steering apparatus, the EPB, P-Lock, the shift apparatus, various devices, and the drive source described above may separately be provided.

<Determination of Moving Direction of Vehicle>

In order for ADK 200 to create an appropriate driving plan in autonomous driving, a state of vehicle main body 100 is desirably appropriately obtained. The moving direction of vehicle 10 represents one of important parameters that indicate a state of vehicle main body 100. By obtaining the moving direction of vehicle 10, ADK 200 can recognize, for example, a traveling state of vehicle 10. In the present embodiment, vehicle control interface 110 determines the moving direction of vehicle 10 based on various types of information from VP 120. Then, vehicle control interface 110 provides a signal indicating the moving direction of vehicle 10 (a signal indicating an actual moving direction (Actual_Moving_Direction)) to ADK 200. The moving direction of vehicle 10 can thus appropriately be conveyed to ADK 200. An approach to determination of the moving direction of vehicle 10 will specifically be described below. Though an example in which vehicle 10 includes four wheels is described below, the present disclosure can be applied similarly also to a vehicle including at most three wheels or a vehicle including at least five wheels.

VP 120 (brake system 121B in the present embodiment) fixes the rotation direction of each wheel (a front left wheel, a front right wheel, a rear left wheel, and a rear right wheel) based on an output from wheel speed sensor 127. Then, VP 120 provides information (WheelSpeed_Rotation) indicating the fixed rotation direction of each wheel to vehicle control interface 110. The information indicating the rotation direction of the wheel provided from VP 120 to vehicle control interface 110 includes information indicating the rotation direction (forward rotation) in which vehicle 10 travels forward or the rotation direction (reverse rotation) in which vehicle 10 travels rearward.

As described above, VP 120 determines Whether or not vehicle 10 has conic to a standstill based on the output from wheel speed sensor 127. Specifically, when the speed of all of four wheels has been set to zero and when all (for example, four) wheel speed values are zero during a certain time period since the speed of all of the four wheels was set to zero, VP 120 determines that vehicle 10 has come to a standstill. When VP 120 determines that vehicle 10 has come to a standstill, VP 120 provides information indicating "Standstill" that indicates stop of vehicle 10 to vehicle control interface 110. The certain time period may be set, for example, to 500 ms. The certain time period is not limited to the above and can be set as appropriate depending on specifications of vehicle 10.

Vehicle control interface 110 determines the moving direction of vehicle 10 based on various types of information received from VP 120. Then, vehicle control interface 110 provides a signal indicating the determined moving direction (the signal indicating the actual moving direction) of vehicle 10 to ADK 200.

When vehicle control interface 110 obtains information indicating "Standstill" from VP 120, it determines the moving direction of vehicle 10 as "Standstill".

When vehicle control interface 110 has not obtained information indicating "Standstill" from VP 120, it determines the moving direction of vehicle 10 based on majority rule based on information indicating the rotation direction of the wheel. Specifically, when the number of wheels rotating in the forward rotation direction is larger than the number of wheels rotating in the reverse rotation direction, vehicle control interface 110 determines the moving direction of vehicle 10 as "Forward". When the number of wheels rotating in the reverse rotation direction is larger than the number of wheels rotating in the forward rotation direction, vehicle control interface 110 determines the moving direction of vehicle 10 as "Reverse". When the number of wheels rotating in the forward rotation direction is equal to the number of wheels rotating in the reverse rotation direction, vehicle control interface 110 determines the moving direction of vehicle 10 as "Undefined". In the present embodiment, when the number of wheels rotating in the forward rotation direction is larger than two, vehicle control interface 110 determines the moving direction of vehicle it as "Forward". When the number of wheels rotating in the reverse rotation direction is larger than two, vehicle control interface 110 determines the moving direction of vehicle 10 as "Reverse", When the number of Wheels rotating in the forward rotation direction is two and the number of wheels rotating in the reverse rotation direction is two, vehicle control interface 110 determines the moving direction of vehicle 10 as "Undefined". For example, a case that driving wheels slip when the vehicle slips down on a slope or a snow-covered road is assumed as the example where the number of wheels rotating in the forward rotation direction is equal to the number of wheels rotating in the reverse rotation direction.

FIG. 3 is a diagram for illustrating setting of a signal indicating an actual moving direction. FIG. 3 shows relation between an actual moving direction (the moving direction of vehicle 10) and a value. Specifically, a value is shown in a field "value" and a rotation direction of a wheel is shown in a field "Description". A field "remarks" is used when there are remarks.

Referring to FIG. 3, a value 0 represents forward travel (Forward). A value 1 represents a reverse travel (Reverse). A value 2 represents stop (Standstill). A value 3 represents undefined (Undefined).

When vehicle control interface 110 determines the moving direction of vehicle 10 as "Forward", it sets the value 0 in the signal indicating the actual moving direction. When vehicle control interface 110 determines the moving direction of vehicle 10 as "Reverse", it sets the value 1 in the signal indicating the actual moving direction. When vehicle control interface 110 determines the moving direction of vehicle 10 as "Standstill", it sets the value 2 in the signal indicating the actual moving direction. When vehicle control interface 110 determines the moving direction of vehicle 10 as "Undefined", it sets the value 3 in the signal indicating the actual moving direction.

When vehicle control interface 110 sets the signal indicating the actual moving direction, it provides the set signal indicating the actual moving direction to ADK 200. ADK 200 that has received the signal indicating the actual moving direction set as above can recognize the moving direction of vehicle 10 based on the value indicated in the signal.

<Procedure of Processing Performed in VP>

Figure 4:
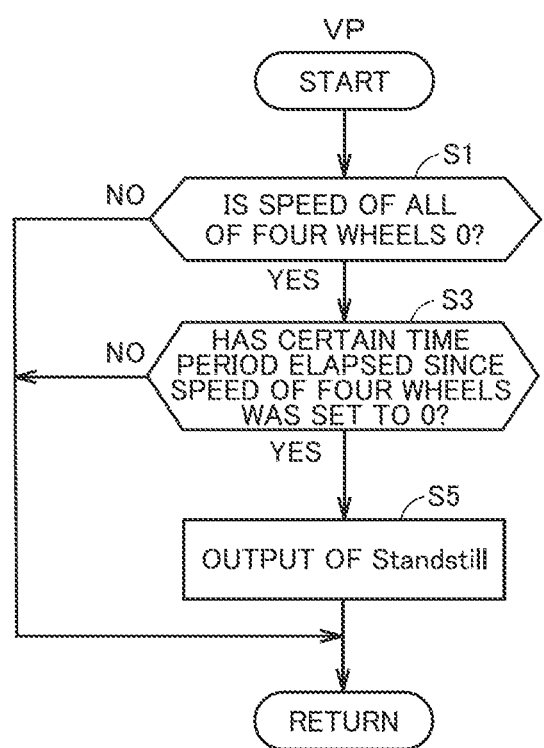
FIG. 4 is a flowchart showing a procedure of processing performed in the VP.

FIG. 4 is a flowchart showing a procedure of processing performed in VP 120, Processing in the flowchart in FIG. 4 is repeatedly performed every prescribed control cycle in VP 120. Though an example in which processing in the flowchart in FIG. 4 is performed by software processing by VP 120 is described, a part or the entirety thereof may be implemented by hardware (electric circuitry) made in VP 120.

VP 120 determines whether or not the speed of all wheels, that is, four wheels, included in vehicle 10 is 0 (a step 1, the step being abbreviated as "S" below). When the speed of all of the four wheels is not zero (NO in S1), VP 120 skips processing thereafter and the process returns.

When the speed of all of the four wheels is zero (YES in S1), VP 120 determines whether or not a certain time period has elapsed since the speed of all of the four wheels was set to zero (S3). When the certain time period has not elapsed (NO in S3), the process returns.

When the certain time period has elapsed, that is, when four wheel speed values are zero during the certain time period (YES in S3), VP 120 provides information Indicating "Standstill" to vehicle control interface 110 (S5).

<Procedure of Processing for Determining Moving Direction of Vehicle>

Figure 5:
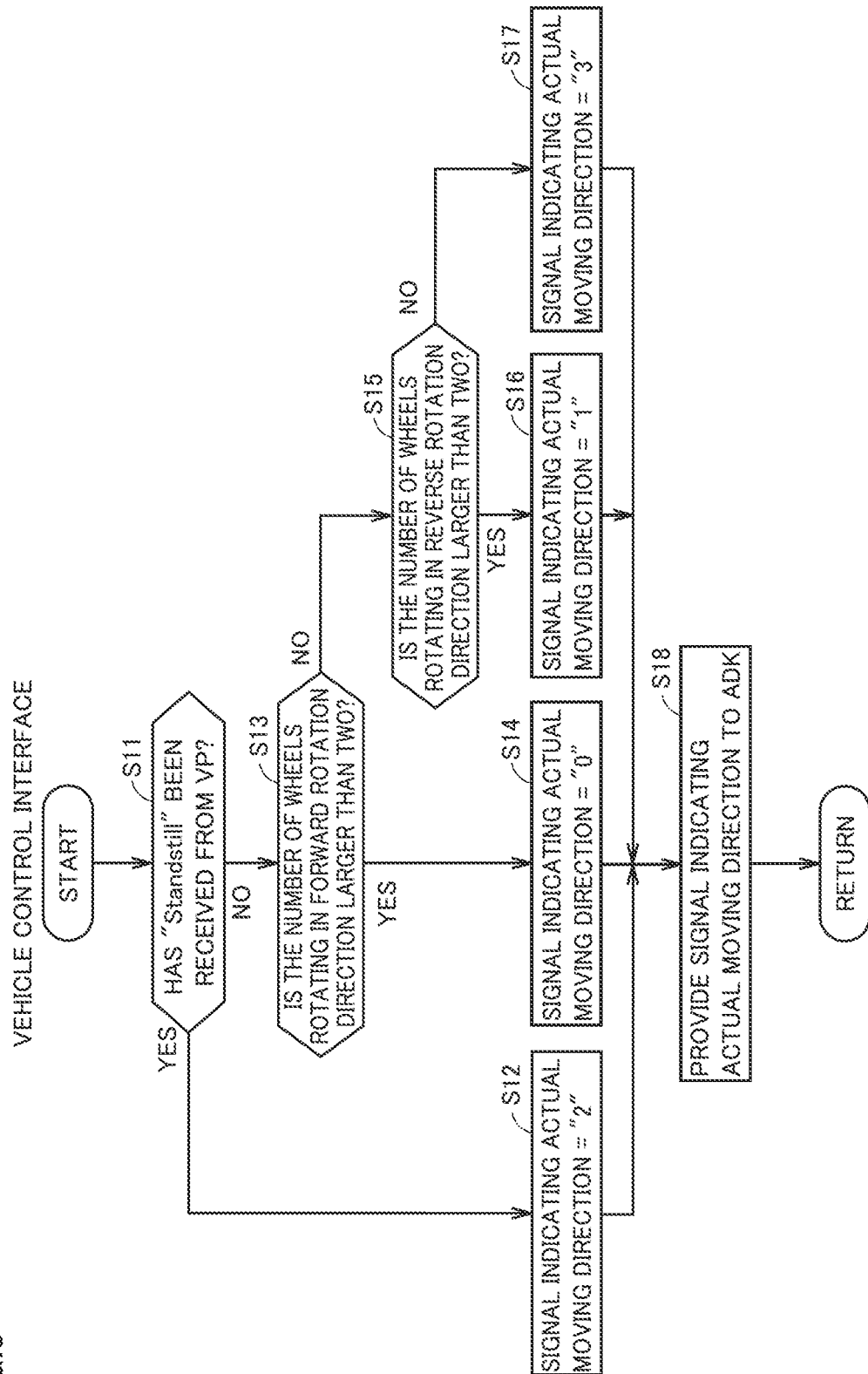
FIG. 5 is a flowchart showing a procedure of processing for determining a moving direction of the vehicle.

FIG. 5 is a flowchart showing a procedure of processing for determining a moving direction of the vehicle. Processing in the flowchart in FIG. 5 is repeatedly performed every prescribed control cycle in vehicle control interface 110. Though an example in which processing in the flowchart in FIG. 5 is performed by software processing b vehicle control interface 110 is described, a part or the entirety thereof may be implemented by hardware (electric circuitry) made in vehicle control interface 110.

Vehicle control interface 110 determines whether or not it has received information indicating "Standstill" from VP 120 (S11). When vehicle control interface 110 has received information indicating "Standstill" from VP 120 (YES in S11), it determines the moving direction of vehicle 10 as "Standstill" and sets the value 2 in the signal indicating the actual moving direction (S12).

When vehicle control interface 110 has not received information indicating "Standstill" from VP 120 (NO in S11), it determines whether or not the number of wheels rotating in the forward rotation direction is larger than two (S13). When the number of wheels rotating in the forward rotation direction is larger than two (YES in S13), vehicle control interface 110 determines the moving direction of vehicle 10 as "Forward" and sets the value 0 in the signal indicating the actual moving direction (S14).

When the number of wheels rotating in the forward rotation direction is not larger than two (NO in S13), that is, when the number of wheels rotating in the forward rotation direction is equal to or smaller than two, vehicle control interface 110 determines whether or not the number of wheels rotating in the reverse rotation direction is larger than two (S15). When the number of wheels rotating in the reverse rotation direction is larger than two (YES in S15), vehicle control interface 110 determines the moving direction of vehicle 10 as "Reverse" and sets the value 1 in the signal indicating the actual moving direction (S16).

When the number of wheels rotating in the reverse rotation direction is not larger than two (NO in S15), that is, when the number of wheels (two) rotating in the forward rotation direction is equal to the number of wheels (two)

rotating in the reverse rotation direction, vehicle control interface 110 determines the moving direction of vehicle 10 as "Undefined" and sets the value 3 in the signal indicating the actual moving direction (S17).

When vehicle control interface 110 sets a value in the signal indicating the actual moving direction, it provides the signal indicating the actual moving direction to ADK 200 (S18). ADK 200 can thus recognize the moving direction of vehicle 10.

As set forth above, in the MaaS system according to the present embodiment, vehicle control interface 110 that interfaces between VP 120 and ADK 200 is provided. Vehicle control interface 110 determines the moving direction of vehicle 10 based on various types of information from VP 120. Then, vehicle control interface 110 provides the signal indicating the moving direction (the signal indicating the actual moving direction) of vehicle 10 to ADK 200. The moving direction of vehicle 10 can thus appropriately be conveyed to ADK 200, By appropriately conveying the moving direction of vehicle 10, ADK 200 can create a more proper driving plan and hence accuracy in autonomous driving can be enhanced.

Even though a developer of vehicle main body 100 is different from a developer of ADK 200, they can be in coordination with each other owing to development of vehicle main body 100 and ADK 200 in accordance with a procedure and a data format (API) determined for vehicle control interface 110.

Though an example in which vehicle control interface 110 determines the moving direction of vehicle 10 is described. In the present embodiment, VP 120 may determine the moving direction of vehicle 10. In this case, vehicle control interface 110 relays the signal indicating the moving direction of vehicle 10 provided from VP 120 and provides the signal to ADK 200.

[Aspects]

The exemplary embodiment described above will be understood by a person skilled in the art as a specific example of aspects below.

(Clause 1) A vehicle according to one aspect is a vehicle on which an autonomous driving system is mountable. The vehicle includes a vehicle platform that controls the vehicle in accordance with an instruction from the autonomous driving system and a vehicle control interface that interfaces between the vehicle platform and the autonomous driving system. The vehicle control interface provides to the autonomous driving system, a signal indicating a moving direction of the vehicle that is determined based on the majority rule in connection with rotation directions of wheels.

(Clause 2) In the vehicle described in Clause 1, all wheel speed values are zero during a certain time period, the vehicle control interface provides to the autonomous driving system, a signal indicating "Standstill" as the signal indicating the moving direction of the vehicle.

(Clause 3) in the vehicle described in Clause 1 or 2, when the number of wheels rotating in a forward rotation direction is larger than the number of wheels rotating in a reverse rotation direction, the vehicle control interface provides a signal indicating "Forward" to the autonomous driving system, and when the number of wheels rotating in the reverse rotation direction is larger than the number of wheels rotating in the forward rotation direction, the vehicle control interface provides a signal indicating "Reverse" to the autonomous driving system.

(Clause 4) In the vehicle described in any one Clauses 1 to 3, when the number of wheels rotating in a forward rotation direction is equal e number of wheels rotating in a reverse rotation direction, the vehicle control interface provides information indicating "Undefined" to the autonomous driving system.

(Clause 5) A vehicle according to one aspect includes an autonomous driving system that creates a driving plan, a vehicle platform that carries out vehicle control in accordance with an instruction from the autonomous driving system, and a vehicle control interface that interfaces between the vehicle platform and the autonomous driving system. The vehicle control interface provides to the autonomous driving system, a signal indicating a moving direction of the vehicle that is determined based on the majority rule in connection with rotation directions of wheels.

(Clause 6) In the vehicle described in Clause 5, when all wheel speed values are zero during a certain time period, the vehicle control interface provides to the autonomous driving system, a signal indicating "Standstill" as the signal indicating the moving direction of the vehicle.

(Clause 7) In the vehicle described in Clause 5 or 6, when the number of wheels rotating in a forward rotation direction is larger than the number of wheels rotating in a reverse rotation direction, the vehicle control interface provides a signal indicating "Forward" to the autonomous driving system, and when the number of wheels rotating in the reverse rotation direction is larger than the number of wheels rotating in the forward rotation direction, the vehicle control interface provides a signal indicating "Reverse" to the autonomous driving system.

(Clause 8) In the vehicle described in any one of Clauses 5 to 7, when the number of wheels rotating in a forward rotation direction is equal to the number of wheels rotating in a reverse rotation direction, the vehicle control interface provides information indicating "Undefined" to the autonomous driving system.

(Clause 9) A method of controlling a vehicle according to one aspect is a method of controlling a vehicle on which an autonomous driving system is mountable. The vehicle includes a vehicle platform that controls the vehicle in accordance with an instruction from the autonomous driving system and a vehicle control interface that interfaces between the vehicle platform and the autonomous driving system. The method includes providing to the autonomous driving system, by the vehicle control interface, a signal indicating a moving direction of the vehicle that is determined based on the majority rule in connection with rotation directions of wheels.

(Clause 10) The method of controlling a vehicle described in Clause 9 further includes providing to the autonomous driving system, by the vehicle control interface, a signal indicating "Standstill" as the signal indicating the moving direction of the vehicle when all wheel speed values are zero during a certain time period.

(Clause 11) The method of controlling a vehicle described in Clause 9 or 10 further includes providing, by the vehicle control interface, a signal indicating "Forward" to the autonomous driving system when the number of wheels rotating in a forward rotation direction is larger than the number of wheels rotating in a reverse rotation direction, and providing, by the vehicle control interface, a signal indicating "Reverse" to the autonomous driving system when the number of wheels rotating M the reverse rotation direction is larger than the number of wheels rotating in the forward rotation direction.

(Clause 12) The method of controlling a vehicle described in any one of Clauses 9 to 11 further includes providing, by the vehicle control interface, information indicating "Undefined" to the autonomous driving system when the number of wheels rotating in a forward rotation direction is equal to the number of wheels rotating in a reverse rotation direction.

Example 1

Toyota's MaaS Vehicle Platform
API Specification
for ADS Developers
[Standard Edition #0.1]
History of Revision

TABLE 1

| Date of Revision | ver. | Summary of Revision | Reviser |
|---|---|---|---|
| 2019 May 4 | 0.1 | Creating a new material | MaaS Business Div. |

Index
1. Outline 4
1.1. Purpose of this Specification 4
1.2. Target Vehicle 4
1.3. Definition of Term 4
1.4. Precaution for Handling 4
2. Structure 5
2.1. Overall Structure of MaaS 5
2.2. System structure of MaaS vehicle 6
3. Application Interfaces 7
3.1, Responsibility sharing of when using APIs 7
3.2. Typical usage of APIs 7
3.3. APIs for vehicle motion control 9
   3.3.1. Functions 9
   3.3.2. Inputs 16
   3.3.3. Outputs 23
3.4. APIs for BODY control 45
   3.41 Functions 45
   3.4.2. Inputs 45
   3.4.3. Outputs 56
3.5. APIs for Power control 68
   3.5.1. Functions 68
   3.5.2. Inputs 68
   3.5.3. Outputs 69
3.6. APIs for Safety 70
   3.6.1. Functions 70
   3.6.2. Inputs 70
   3.6.3. Outputs 70
3.7. APIs for Security 74
   3.7.1. Functions 74
   3.7.2. Inputs 74
   3.7.3. Outputs 76
3.8. APIs for MaaS Service 80
   3.8.1. Functions 80
   3.8.2. Inputs 80
   3.8.3. Outputs 80
1. Outline
1.1. Purpose of this Specification
This document is an API specification of Toyota Vehicle Platform and contains the outline, the usage and the caveats of the application interface.
1.2. Target Vehicle
e-Palette, MaaS vehicle based on the POV (Privately Owned Vehicle) manufactured by Toyota 1.3. Definition of Term

TABLE 2

| Term | Definition |
|---|---|
| ADS | Autonomous Driving System. |
| ADK | Autonomous Driving Kit |
| VP | Vehicle Platform. |
| VCIB | Vehicle Control Interface Box. This is an ECU for the interface and the signal converter between ADS and Toyota VP's sub systems. |

Figure 6:
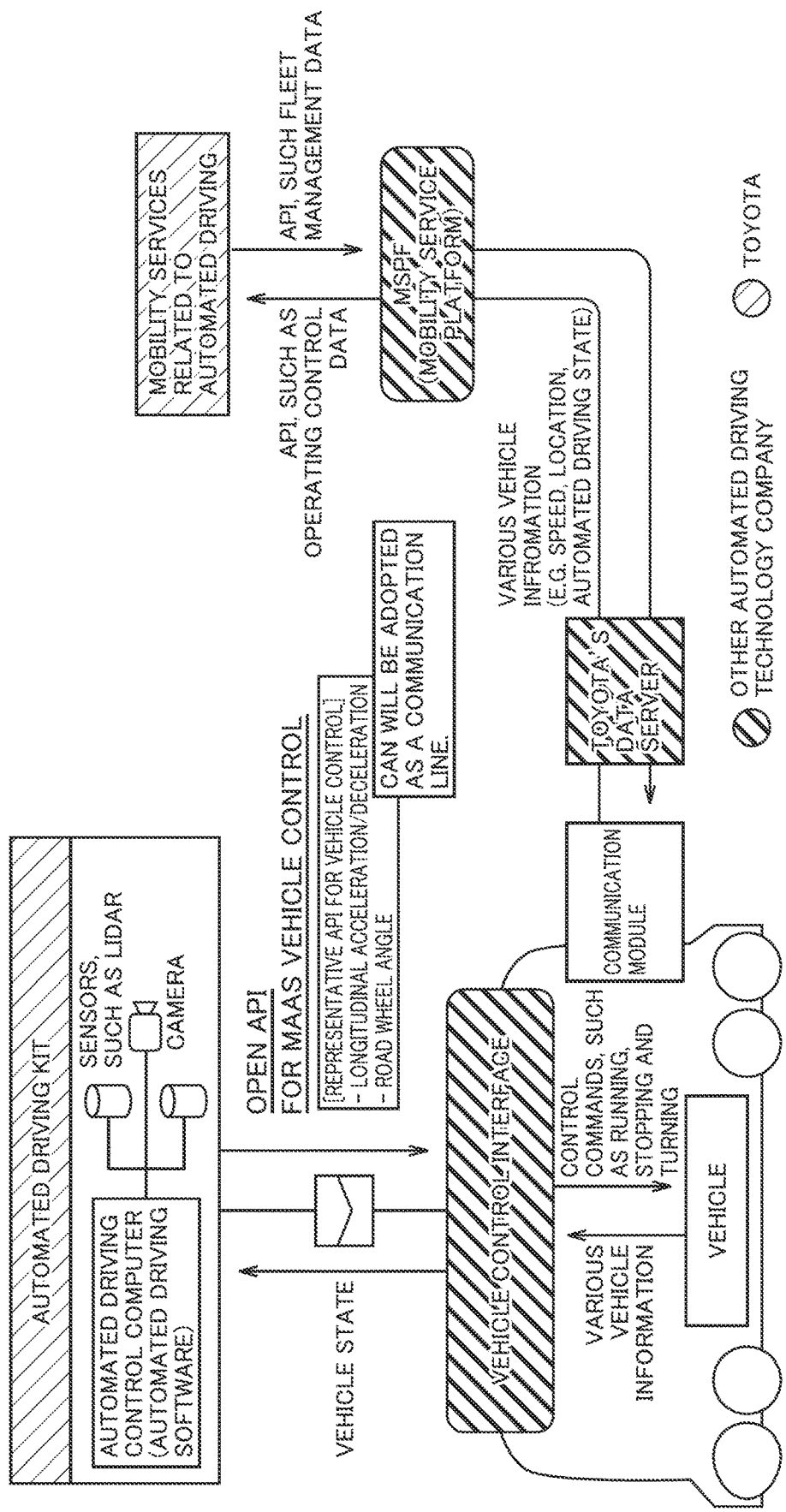
FIG. 6 is a diagram of an overall, configuration of MaaS.
Figure 7:
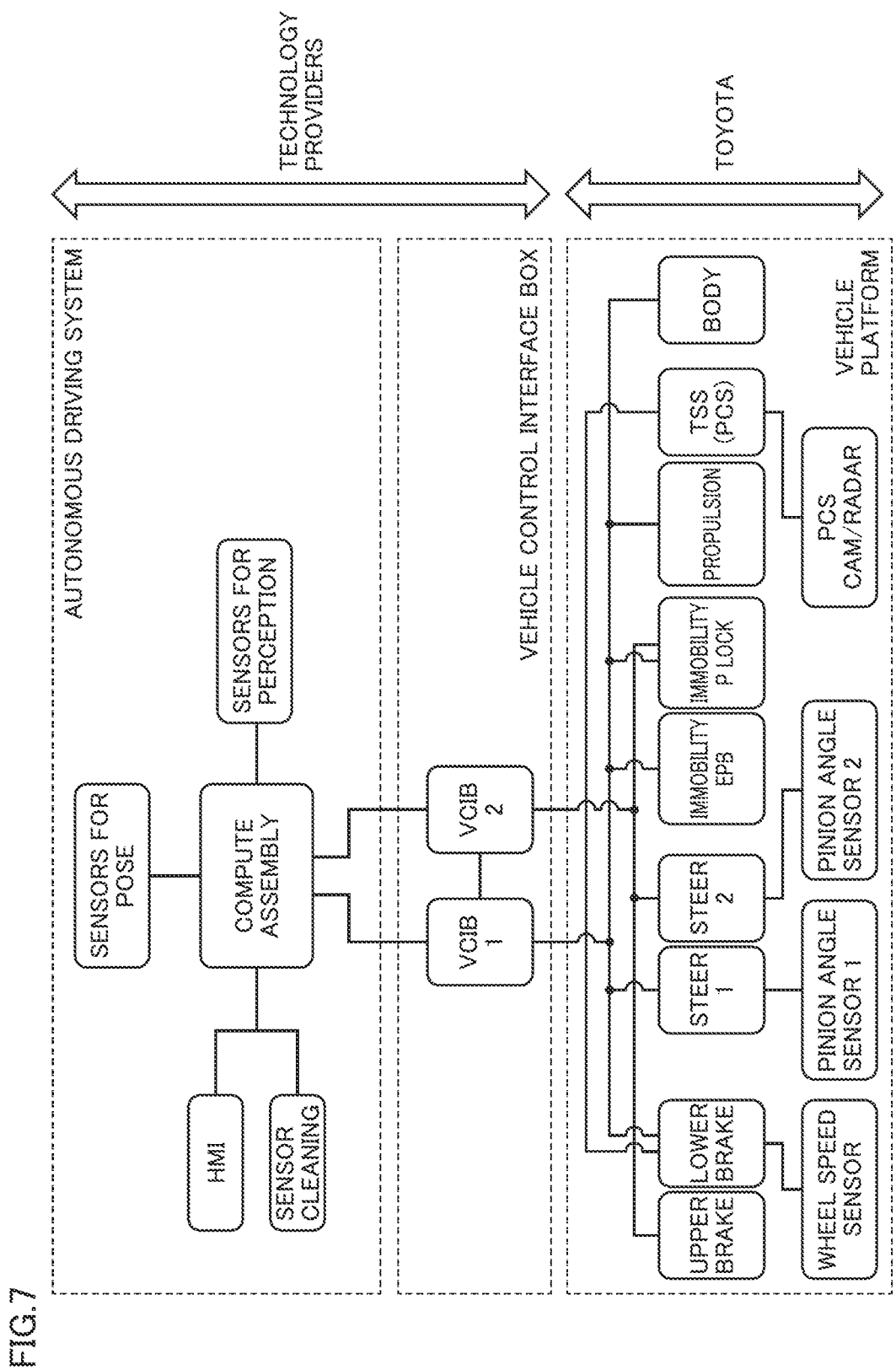
FIG. 7 is a diagram of a system configuration of a MaaS vehicle.

1.4. Precaution for Handling
This is an early draft of the document.
All the contents are subject to change. Such changes are notified to the users. Please note that some parts are still T.B.D. will be updated in the future.
2. Structure
2.1. Overall Structure of MaaS
The overall structure of MaaS with the target vehicle is shown (FIG. 6).
Vehicle control technology is being used as an interface for technology providers.
Technology providers can receive open. API such as vehicle state and vehicle control, necessary for development of automated driving systems.
2.2. System Structure of MaaS Vehicle
The system architecture as a premise is shown (FIG. 7).
The target vehicle will adopt the physical architecture of using CAN for the bus between ADS and VCIB. In order to realize each API in this document, the CAN frames and the bit assignments are shown in the form of "bit assignment table" as a separate document.
3. Application Interfaces
3.1. Responsibility Sharing of when Using APIs
Basic responsibility sharing between ADS and vehicle VP is as follows when using APIs.
[ADS]
The ADS should create the driving plan, and should indicate vehicle control values to the VP.
[VP]
The Toyota VP should control each system of the VP based on indications from an ADS.
3.2. Typical Usage of APIs
In this section, typical usage of APIs is described.
CAN will be adopted as a communication line between ADS and VP. Therefore, basically. APIs should be executed every defined cycle time of each API by ADS.
A typical workflow of ADS of when executing APIs is as follows (FIG. 8).
3.3. APIs for Vehicle Motion Control
In this section, the APIs for vehicle motion control which is controllable in the MaaS vehicle is described,
3.3.1. Functions
3.3.1.1. Standstill, Start Sequence
The transition to the standstill (immobility) mode and the vehicle start sequence are described. This function presupposes the vehicle is in Autonomy_State=Autonomous Mode. The request is rejected in other modes.
The below diagram shows an example.
Acceleration Command requests deceleration and stops the vehicle. Then, when Longitudinal_Velocity is confirmed as 0 [km/h], Standstill Command "Applied" is sent, After the brake hold control is finished, Standstill Status becomes "Applied". Until then, Acceleration Command has to continue deceleration request. Either Standstill Command "Applied" or Acceleration Command's deceleration request were canceled, the transition to the brake hold control will not happen. After that, the vehicle continues to be standstill as far as Standstill Command "Applied" is being sent. Acceleration Command can be set to 0 (zero) during this period.

If the vehicle needs to start, the brake hold control is cancelled by setting Standstill Command to "Released". At the same time, acceleration/deceleration is controlled based on Acceleration Command (FIG. 9).

EPB is engaged when Standstill Status="Applied" continues for 3 minutes.

3.3.1.2. Direction Request Sequence

The shift change sequence is described. This function presupposes that Autonomy_State=Autonomous Mode. Otherwise, the request is rejected.

Shift change happens only during Actual_Moving_Direction="standstill"). Otherwise, the request is rejected.

In the following diagram shows, an example. Acceleration Command requests deceleration and makes the vehicle stop. After Actual_Moving_Direction is set to "standstill" am shift position can be requested by Propulsion Direction Command. (In the example below, "D"→"R").

During shift change, Acceleration Command has to request deceleration.

Figure 10:
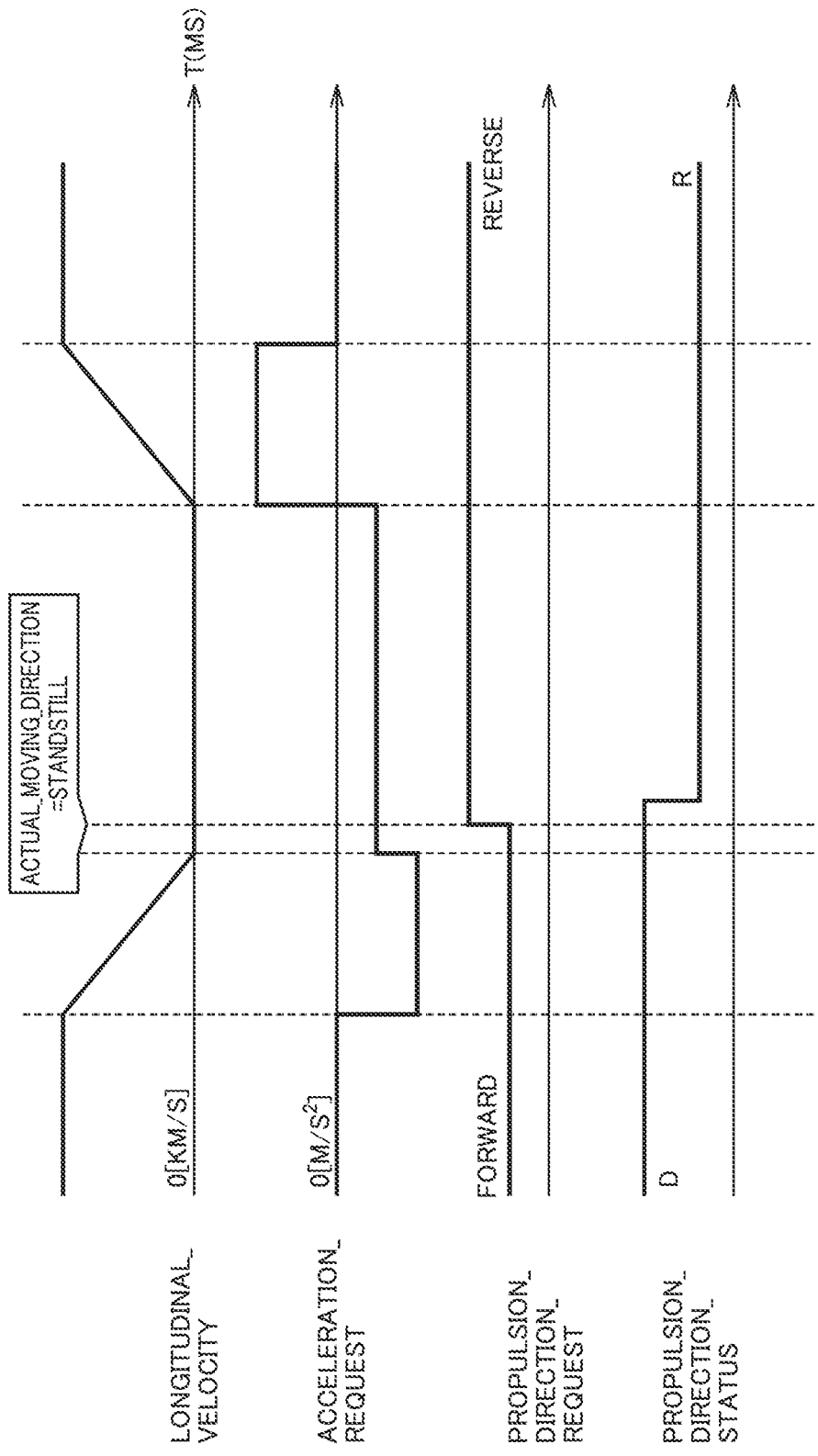
FIG. 10 is a diagram showing an exemplary timing Chart of the API relating to shift change of the MaaS vehicle.

After the shift change, acceleration/deceleration is controlled based on Acceleration Command value (FIG. 10).

3.3.1.3. WheelLock Sequence

The engagement and release of wheel lock is described. This function presupposes Autonomy_State=Autonomous Mode, otherwise the request is rejected.

This function is conductible only during vehicle is stopped. Acceleration Command requests deceleration and makes the vehicle stop. After Actual_Moving_Direction is set to "standstill", WheelLock is engaged by immobilization Command="Applied". Acceleration Command is set to Deceleration until Immobilization Status is set to "Applied".

If release is desired, immobilization Command="Release" is requested when the vehicle is stationary. Acceleration Command is set to Deceleration at that time.

Figure 11:
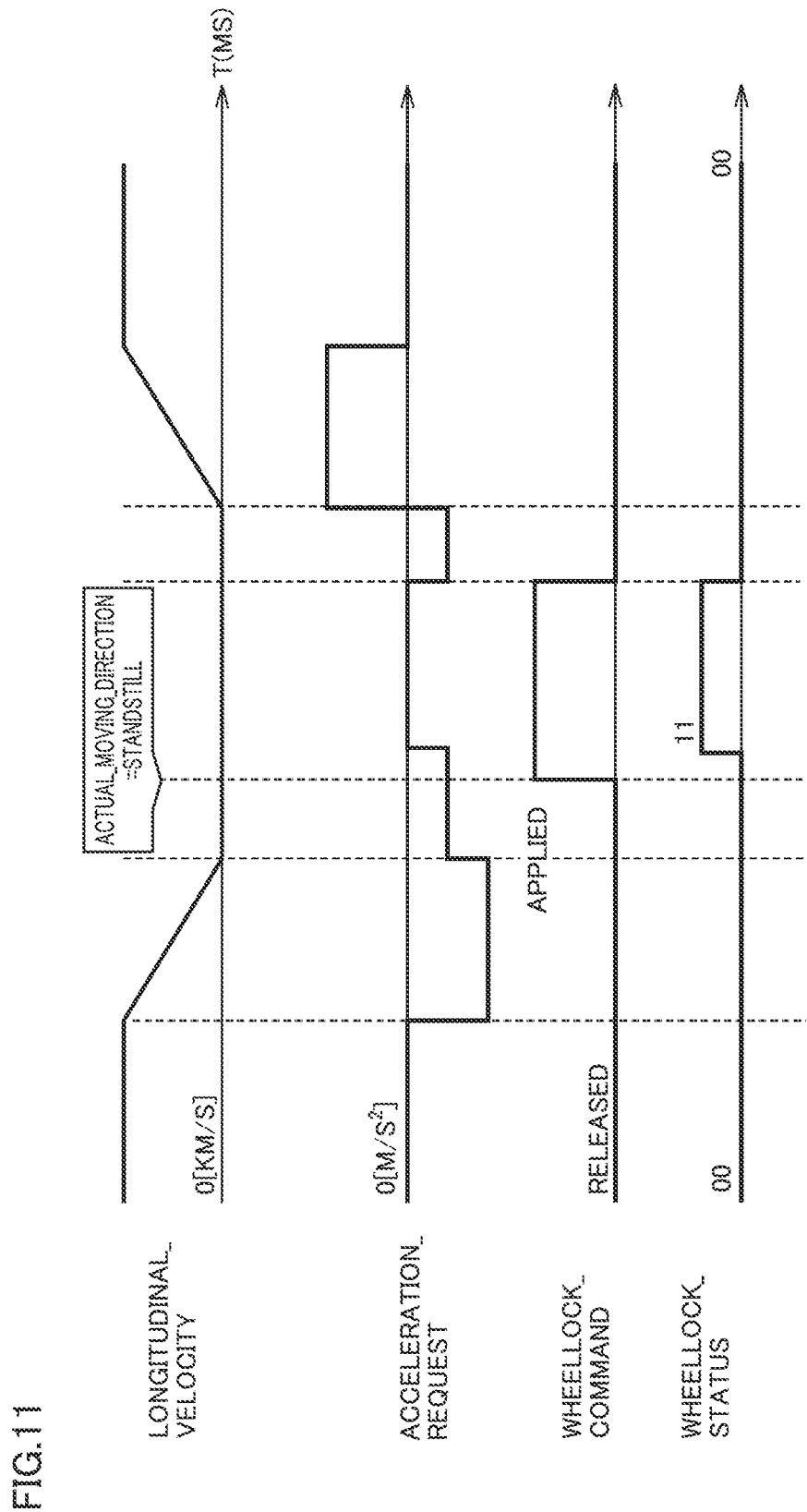
FIG. 11 is a diagram showing an exemplary timing chart of the API relating to wheel lock of the MaaS vehicle.

After this, the vehicle is accelerated/decelerated based on Acceleration Command value (FIG. 11).

3.3.1.4. Road_Wheel_Angle Request

This function presupposes Autonomy_State="Autonomous Mode" and the request is rejected otherwise.

Tire Turning Angle Command is the relative value from Estimated_Roadheel_Angle_Actual.

For example, in case that Estimated_Road_Wheel_Angle_Actual=0.1 [rad] while the vehicle is going straight;

If ADS requests to go straight ahead, Tire Turning Angle Command should be set to 0+0.1=0.1. [rad].

If ADS requests to steer by −0.3 [rad], Tire Turning Angie Command should be set to −3+0.1=−0.2 [rad].

3.3.1.5. Rider Operation

3.3.1.5.1. Acceleration Pedal Operation

While in Autonomous driving mode, accelerator pedal stroke is eliminated from the vehicle acceleration demand selection.

3.3.1.5.2. Brake Pedal Operation

The action when the brake pedal is operated. In the autonomy mode, target vehicle deceleration is the sum of 1) estimated deceleration from the brake pedal stroke and 2) deceleration request from AD system.

3.3.1.5.3. Shift_Lever_Operation

In Autonomous driving mode, driver operation of the shift lever is not reflected in Propulsion Direction Status.

If necessary, ADS confirms Propulsion Direction by Driver and changes shift position by using Propulsion Direction Command.

3.3.1.5.4. Steering Operation

When the driver (rider) operates the steering, the maximum is selected from 1) the torque value estimated from driver operation angle, and 2) the torque value calculated from requested wheel angle.

Note that Tire Turning Angle Command is not accepted if the driver strongly turns the steering wheel. The above-mentioned is determined by Steering_Wheel_Intervention flag

3.3.2. Inputs

TABLE 3

| Signal Name | Description | Redundancy |
|---|---|---|
| Propulsion Direction Command | Request to switch between forward (D range) and back (R range) | N/A |
| Immobilization Command | Request to engage/release WheelLock | Applied |
| Standstill Command | Request to maintain stationary | Applied |
| Acceleration Command | Request to accelerate/decelerate | Applied |
| Tire Turning Angle Command | Request front wheel angle | Applied |
| Autonomization Command | Request to transition between manual mode and autonomy mode | Applied |

3.3.2.1. Propulsion Direction Command

Request to switch between forward (D range) and back (R range)

Values

TABLE 4

| value | Description | Remarks |
|---|---|---|
| 0 | No Request | |
| 2 | R | Shift to R range |
| 4 | D | Shift to D range |
| other | Reserved | |

Remarks

Only available when Autonomy_State="Autonomous Mode"

D/R is changeable only the vehicle is stationary (Actual_Moving_Direction="standstill").

The request while driving (moving) is rejected.

When system requests D/R shifting, Acceleration Command is sent deceleration (−0.4 m/s$^2$) simultaneously, (Only while brake is applied.)

The request may not be accepted in following cases.

Direction_Control_Degradation_Modes="Failure detected"

3.3.2.2. Immobilization Command

Request to engage/release WheelLock

Values

TABLE 5

| value | Description | Remarks |
|---|---|---|
| 0 | No Request | |
| 1 | Applied | EPB is turned on and TM shifts to P range |

TABLE 5-continued

| value | Description | Remarks |
|---|---|---|
| 2 | Released | EPB is turned off and TM shifts to the value of Propulsion Direction Command |

Remarks
Available only when Autonomy_State="Autonomous Mode"
Changeable only when the vehicle is stationary (Actual_Moving_Direction="standstill")
The request is rejected when vehicle is running.
When Apply/Release mode change is requested, Acceleration Command is set to deceleration (−0.4 m/s$^2$). (Only while brake is applied.)

3.3.2.3. Standstill Command
Request: the vehicle to be stationary
Values

TABLE 6

| value | Description | Remarks |
|---|---|---|
| 0 | No Request | |
| 1 | Applied | Standstill is requested |
| 2 | Released | |

Remarks
Only available when Autonomy_State="Autonomous Mode"
Confirmed by Standstill Status="Applied"
When the vehicle is stationary (Actual_Moving_Direction="standstill"), transition to Stand Still is enabled.
Acceleration Command has to be continued until Standstill Status becomes "Applied" and Acceleration Command's deceleration request (−0.4 m/s$^2$) should be continued.
There are more cases where the request is not accepted. Details are T.B.D.

3.3.2.4. Acceleration Command
Command vehicle acceleration.
Values
Estimated_Max_Decel_Capability to Estimated_Max_Accel_Capability [m/s$^2$]
Remarks
Only available when Autonomy_State="Autonomous Mode"
Acceleration (+) and deceleration (−) request based on Propulsion Direction Status direction
The upper flower limit will vary based on Estimated_Max_Decel_Capability and Estimated_Max_Accel_Capability.
When acceleration more than Estimated_Max_Accel_Capability is requested, the request is set to Estimated_Max_Accel_Capability.
When deceleration more than Estimated_Max_Decel_Capability is requested, the request is set to Estimated_Max_Decel_Capability.
Depending on the accel/brake pedal stroke, the requested acceleration may not be meet. See 3.4.1.4 for more detail.
When Pre-Collision system is activated simultaneously, minimum acceleration (maximum deceleration) is selected.

3.3.2.5. Tire Turning Angle Command
Command Tire Turning Angle
Values

TABLE 7

| value | Description | Remarks |
|---|---|---|
| — | | [unit: rad] |

Remarks
Left is positive value (+). Right is negative value (−).
Available only when Autonomy_State="Autonomous mode"
The output of Estimated_Road_Wheel_Angle_Actual when the vehicle is going straight, is set to the reference value (0),
This requests relative value of Estimated_Road_Wheel_Angle_Actual. (See 3.4.1.1 for details)
The requested value is within Current_Road_Wheel_Angle_Rate_Limit.
The requested value may not be fulfilled depending on the steer angle by the driver.

3.3.2.6. Autonomization Command
Request to transition between manual mode and autonomy mode
Values

TABLE 8

| value | Description | Remarks |
|---|---|---|
| 00b | No Request For Autonomy | |
| 01b | Request For Autonomy | |
| 10b | Deactivation Request | means transition request to manual mode |

The mode may be able not to be transitioned to Autonomy mode. (e.g., In case that a failure occurs in the vehicle platform.)

3.3.3. Outputs

TABLE 9

| Signal Name | Description | Redundancy |
|---|---|---|
| Propulsion Direction Status | Current shift range | N/A |
| Propulsion Direction by Driver | Shift lever position by driver | N/A |
| Immobilization Status | Output of EPB and Shift P | Applied |
| Immobilization Request by Driver | EPB switch status by driver | N/A |
| Standstill Status | Stand still status | N/A |
| Estimated_Coasting_Rate | Estimated vehicle deceleration when throttle is closed | N/A |
| Estimated_Max_Accel_Capability | Estimated maximum acceleration | Applied |
| Estimated_Max_Decel_Capability | Estimated maximum deceleration | Applied |
| Estimated_Road_Wheel_Angle_Actual | Front wheel steer angle | Applied |
| Estimated_Road_Wheel_Angle_Rate_Actual | Front wheel steer angle rate | Applied |
| Steering_Wheel_Angle_Actual | Steering wheel angle | N/A |

TABLE 9-continued

| Signal Name | Description | Redundancy |
|---|---|---|
| Steering_Wheel_Angle_Rate_Actual | Steering wheel angle rate | N/A |
| Current_Road_Wheel_Angle_Rate_Limit | Road wheel angle rate limit | Applied |
| Estimated_Max_Lateral_Acceleration_Capability | Estimated max lateral acceleration | Applied |
| Estimated_Max_Lateral_Acceleration_Rate_Capability | Estimated max lateral acceleration rate | Applied |
| Accelerator_Pedal_Position | Position of the accelerator pedal (How much is the pedal depressed?) | N/A |
| Accelerator_Pedal_Intervention | This signal shows whether the accelerator pedal is depressed by a driver (intervention) | N/A |
| Brake_Pedal_Position | Position of the brake pedal (How much is the pedal depressed?) | T.B.D. |
| Brake_Pedal_Intervention | This signal shows whether the brake pedal is depressed by a driver (intervention) | T.B.D. |
| Steering_Wheel_Intervention | This signal shows whether the steering wheel is turned by a driver (intervention) | T.B.D. |
| Shift_Lever_Intervention | This signal shows whether the shift lever is controlled by a driver (intervention) | T.B.D. |
| WheelSpeed_FL | wheel speed value (Front Left Wheel) | N/A |
| WheelSpeed_FL_Rotation | Rotation direction of wheel (Front Left) | N/A |
| WheelSpeed_FR | wheel speed value (Front Right Wheel) | N/A |
| WheelSpeed_FR_Rotation | Rotation direction of wheel (Front Right) | N/A |
| WheelSpeed_RL | wheel speed value (Rear Left Wheel) | Applied |
| WheelSpeed_RL_Rotation | Rotation direction of wheel (Rear Left) | Applied |
| WheelSpeed_RR | wheel speed value (Rear Right Wheel) | Applied |
| WheelSpeed_RR_Rotation | Rotation direction of wheel (Rear Right) | Applied |
| Actual_Moving_Direction | Moving direction of vehicle | Applied |
| Longitudinal_Velocity | Estimated longitudinal velocity of vehicle | Applied |
| Longitudinal_Acceleration | Estimated longitudinal acceleration of vehicle | Applied |
| Lateral_Acceleration | Sensor value of lateral acceleration of vehicle | Applied |
| Yawrate | Sensor value of Yaw rate | Applied |
| Autonomy_State | State of whether autonomy mode or manual mode | Applied |
| Autonomy_Ready | Situation of whether the vehicle can transition to autonomy mode or not | Applied |
| Autonomy_Fault | Status of whether the fault regarding a functionality in autonomy mode occurs or not | Applied |

3.3.3.1. Propulsion Direction Status

Current Shift Range

Values

TABLE 10

| value | Description | remarks |
|---|---|---|
| 0 | Reserved | |
| 1 | P | |
| 2 | R | |
| 3 | N | |
| 4 | D | |
| 5 | B | |
| 6 | Reserved | |
| 7 | Invalid value | |

Remarks

When the shift range is indeterminate, this output is set to "Invalid Value".

When the vehicle becomes the following status during VO mode, [Propulsion Direction Status] will turn to "P",

[Longitudinal_Velocity]=0 [km/h]

[Brake_Pedal_Position]<Threshold Value (T.B.D.) (in case of being determined that the pedal isn't depressed)

[1st_Left_Seat_Belt_Status]=Unbuckled

[1st_Left_Door_Open_Status]=Opened 3.3.3.2. Propulsion Direction by Driver

Shift Lever Position by Driver Operation

Values

TABLE 11

| value | Description | remarks |
|---|---|---|
| 0 | No Request | |
| 1 | P | |
| 2 | R | |
| 3 | N | |
| 4 | D | |
| 5 | B | |
| 6 | Reserved | |
| 7 | Invalid value | |

Remarks

Output based on the lever position operated by driver

If the driver releases his hand of the shift lever, the lever returns to the central position and the output is set as "No Request".

When the vehicle becomes the following status during NVO mode, [Propulsion Direction by Driver] will turn to "1(P)".

[Longitudinal_Velocity]=0[km/h]

[Brake_Pedal_Position]<threshold value (T.B.D.) (in case of being determined that the pedal isn't depressed)

[1st_Left_Seat_Belt_Status]=Unbuckled

[1st_Left_Door_Open_Status]=Opened.

3.3.3.3. Immobilization Status
Output EPB and Shift-P status
Values
<Primary>

TABLE 12

| Value | | | |
|---|---|---|---|
| Shift | EPB | Description | Remarks |
| 0 | 0 | Shift set to other than P, and EPB Released | |
| 1 | 0 | Shift set to P and EPB Released | |
| 0 | 1 | Shift set to other than P, and EPB applied | |
| 1 | 1 | Shift set to P and EPB Applied | |

<Secondary>

TABLE 13

| Value | | | |
|---|---|---|---|
| Shift | | Description | Remarks |
| 0 | 0 | Other than Shift P | |
| 1 | 0 | Shift P | |
| 0 | 1 | Reserved | |
| 1 | 1 | Reserved | |

Remarks
Secondary signal does not include EPB lock status.
3.3.3.4. Immobilization Request by Driver
Driver operation of EPB switch
Values

TABLE 14

| value | Description | remarks |
|---|---|---|
| 0 | No Request | |
| 1 | Engaged | |
| 2 | Released | |
| 3 | Invalid value | |

Remarks
"Engaged" is outputted while the EPB switch is being pressed.
"Released" is outputted while the EPB switch is being
3.3.3.5. Standstill Status
Vehicle Stationary Status
Values

TABLE 15

| Value | Description | remarks |
|---|---|---|
| 0 | Released | |
| 1 | Applied | |
| 2 | Reserved | |
| 3 | Invalid value | |

Remarks
When Standstill Status=Applied continues for 3 minutes, ERB is activated.
If the vehicle is desired to start, ADS requests Standstill Command "Released".
3.3.3.6. Estimated_Coasting_Rate
Estimated vehicle deceleration when throttle is closed.
Values
[unit: m/s$^2$]
Remarks
Estimated acceleration at WOT is calculated.
Slope and road load etc. are taken into estimation.
When the Propulsion Direction Status is "D", the acceleration to the forward direction shows a positive value.
When the Propulsion Direction Status is "R", the acceleration to the reverse direction shows a positive value.
3.3.3.7. Estimated_Max_Accel_Capability
Estimated maximum acceleration
Values
[unit: m/s$^2$],
Remarks
The acceleration at WOT is calculated.
Slope and road load etc. are taken into estimation.
The direction decided by the shift position is considered be plus.
3.3.3.8 Estimated_Max_Decel_Capability
Estimated maximum deceleration
Values
−9.8 to 0 [unit: m/s$^2$]
Remarks
Affected by Brake_System_Degradation_Modes. Details are T.B.D.
Based on vehicle state or road condition, cannot output in some cases
3.3.3.9. Estimate_Road_Wheel_Angle_Actual
Front wheel steer angle
Values

TABLE 16

| value | Description | Remarks |
|---|---|---|
| others | [unit: rad] | |
| Minimum Value | Invalid value | The sensor is invalid. |

Remarks
Left is positive value (+). Right is negative value (−)
Before "the wheel angle when the vehicle is wing straight" becomes available, this signal is Invalid value.
3.3.3.10. Estimated_Road_Wheel_Angle_Rate_Actual
Front wheel steer angle rate
Values

TABLE 17

| value | Description | Remarks |
|---|---|---|
| others | [unit: rad/s] | |
| Minimum Value | Invalid value | |

Remarks
Left is positive value (+), Right is negative value (−).
3.3.3.11. Steering_Wheel_Angle_Actual
Steering wheel angle
Values

TABLE 18

| Value | Description | Remarks |
|---|---|---|
| others | [unit: rad] | |
| Minimum Value | Invalid value | |

Remarks
Left is positive value (+). Right is negative value (−).
The steering angle converted from the steering assist motor angle Before "the wheel angle when the vehicle is going straight" becomes available, this signal is Invalid value, 3.3.3.12. Steering_Wheel_Angle_Rate_Actual Steering wheel angle rate Values

TABLE 19

| Value | Description | Remarks |
|---|---|---|
| others | [unit: rad/s] | |
| Minimum Value | invalid value | |

Remarks

Left is positive value (+). Right is negative value (−).

The steering angle rate converted from the steering assist motor angle rate

Current_Road_Wheel_Angle_Rate_Limit

Road wheel angle rate limit

Values

When stopped: 0.41 [rad/s]

While running: Show "Remarks"

Remarks

Calculated from the "vehicle speed—steering angle rate" chart like below

A) At a very low speed or stopped situation, use fixed value of 0.4 [rad/s]

Figure 12:
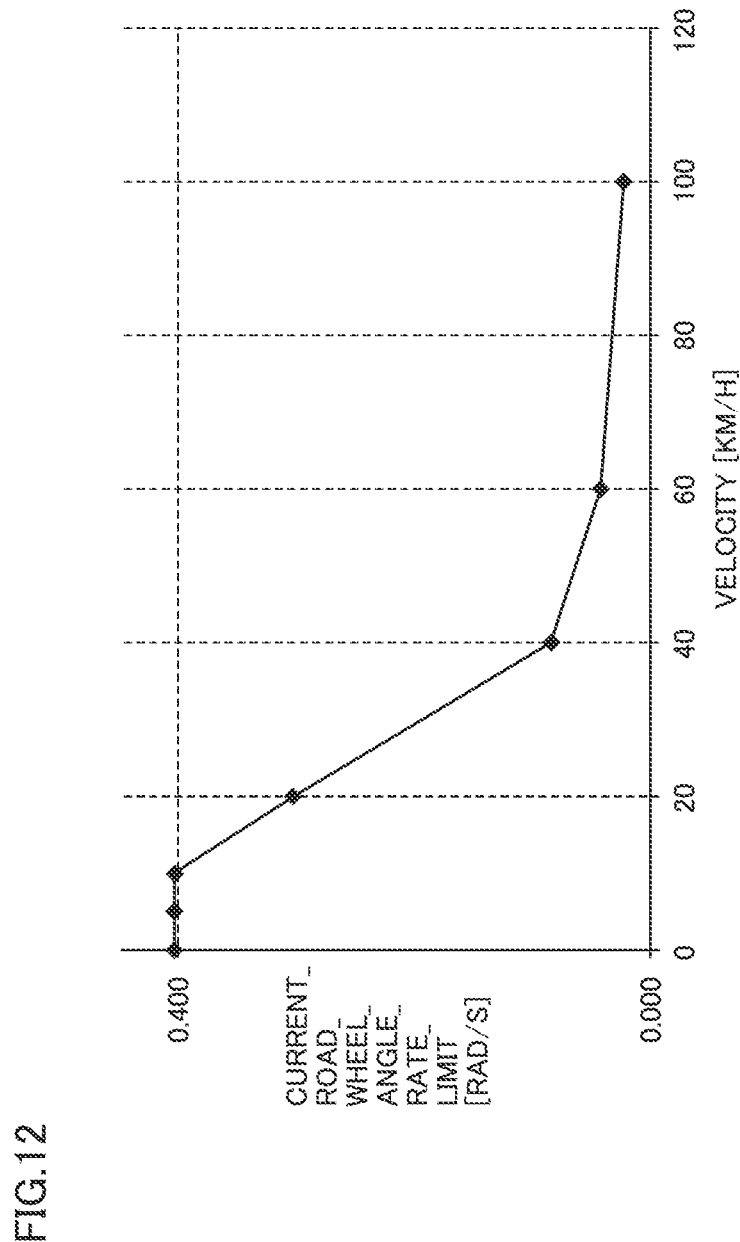
FIG. 12 is a diagram showing a limit value of variation in the turning angle.

B) At a higher speed, the steering angle rate is calculated from the vehicle speed using 2.94 m/s$^3$ The threshold speed between A and B is 10 [km/h] (FIG. 12).

3.3.3.14. Estimated_Max_Lateral_Acceleration_Capability

Estimated max lateral acceleration

Values 2.94 [unit: m/s$^2$] fixed value

Remarks

Wheel Angle controller is designed within the acceleration range up to 2.94 m/s$^2$.

3.3.3.15. Estimated_Max_Lateral_Acceleration_Rate_Capability

Estimated max lateral acceleration rate

Values 2.94 [unit: m/s$^2$] fixed value

Remarks

Wheel Angle controller is designed within the acceleration range up to 2.94 m/s$^2$.

3.3.3.16. Accelerator_Pedal_Position

Position of the accelerator pedal (Flow much is the pedal depressed?)

Values 0 to 100 [unit: %]

Remarks

In order not to change the acceleration openness suddenly, this signal is filtered by smoothing process.

In normal condition

The accelerator position signal after zero point calibration is transmitted.

In failure condition

Transmitted failsafe value (0×FF)

3.3.3.17. Accelerator_Pedal_Intervention

This signal shows Whether the accelerator pedal is depressed by a driver (intervention).

Values

TABLE 20

| Value | Description | Remarks |
|---|---|---|
| 0 | Not depressed | |
| 1 | depressed | |
| 2 | Beyond autonomy acceleration | |

Remarks

When Accelerator_Pedal_Position is higher than the defined threshold value (ACCL_INTV), this signal [Accelerator_Pedal_Intervention] will turn to "depressed", When the requested acceleration from depressed acceleration pedal is higher than the requested acceleration from system (ADS, PCS etc.), this signal will turn to "Beyond autonomy acceleration".

During NVO mode, accelerator request will be rejected. Therefore, this signal t gill not turn to "2".

Figure 13:
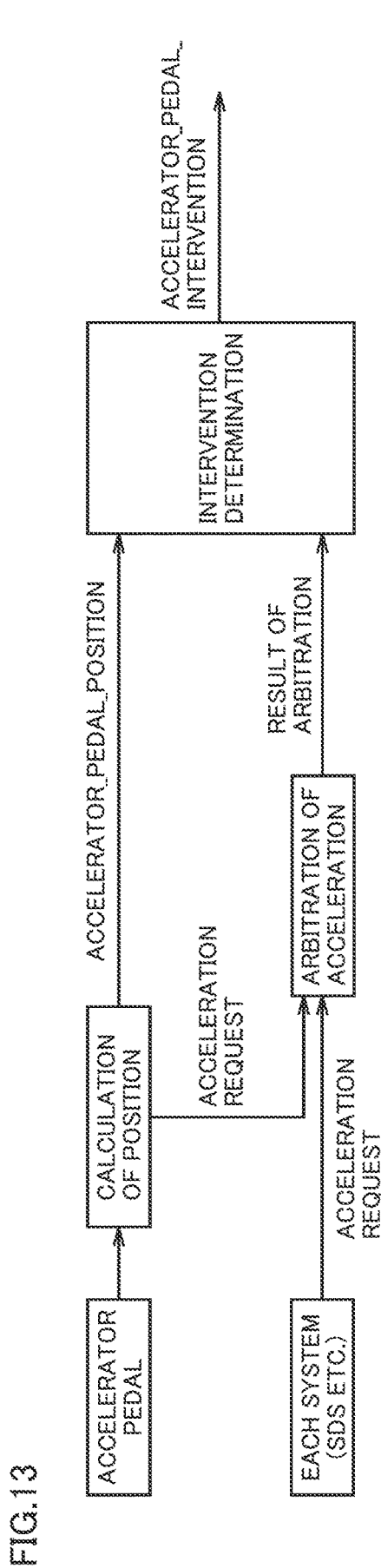
FIG. 13 is a diagram illustrating intervention by an accelerator pedal.

Detail design (FIG. 13)

3.3.3.18. Brake_Pedal_Position

Position of the brake pedal (How much is the pedal depressed?)

Values 0 to 100 [unit: %]

Remarks

In the brake pedal position sensor failure:

Transmitted failsafe value (0×FF)

Due to assembling error, this Value might be beyond 100%.

3.3.3.19. Brake_Pedal_Intervention

This signal shows whether the brake pedal is depressed by a driver (intervention).

Values

TABLE 21

| Value | Description | Remarks |
|---|---|---|
| 0 | Not depressed | |
| 1 | depressed | |
| 2 | Beyond autonomy deceleration | |

Remarks

When Brake_Pedal_Position is higher than the defined threshold value (BRK_INTV), this signal [Brake_Pedal_Intervention] will turn to "depressed".

When the requested deceleration from depressed brake pedal is higher than the requested deceleration from system (ADS, PCS etc.), this signal will turn to "Beyond autonomy deceleration".

Figure 14:
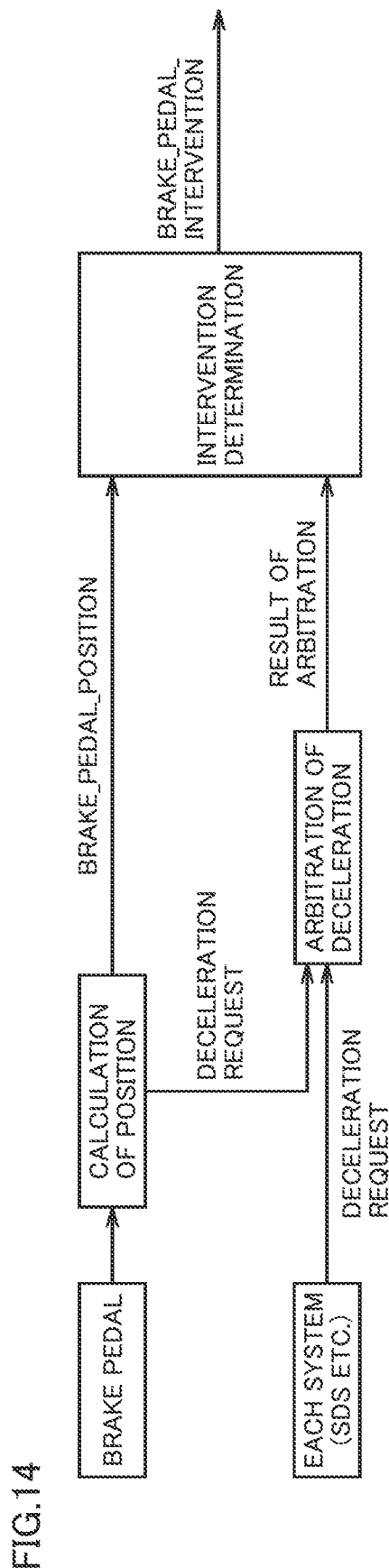
FIG. 14 is a diagram illustrating intervention by a brake pedal.

Detail design (FIG. 14)

Steering_Wheel_Intervention

This signal shows whether the steering wheel is turned by a river (intervention).

Values

TABLE 22

| Value | Description | Remarks |
|---|---|---|
| 0 | Not turned | |
| 1 | Turned collaboratively | Driver steering torque + steering motor torque |
| 2 | Turned by human driver | |

Remarks

In "Steering Wheel Intervention=1", considering the human driver's intent, EPS system will drive the steering with the Human driver collaboratively.

In "Steering Wheel Intervention=2", considering the human driver's intent, EPS system will reject the steering requirement from autonomous driving kit. (The steering will be driven the human driver.)

3.3.3.21 Shift_Lever_Intervention

This signal shows whether the shift lever is controlled by a driver (intervention).

Values

TABLE 23

| Value | Description | Remarks |
|---|---|---|
| 0 | OFF | |
| 1 | ON | Controlled (moved to any shift position) |

Remarks

N/A

WheelSpeed_FL, WheelSpeed_FR, WheelSpeed_RL, WheelSpeed_RR wheel speed value

Values

TABLE 24

| Value | Description | Remarks |
|---|---|---|
| others | Velocity [unit: m/s] | |
| Maximum Value | Invalid value | The sensor is invalid. |

Remarks

T.B.D.

3.3.3.23. WheelSpeed_FL_Rotation, WheelSpeed_FR_Rotation, WheelSpeed_RL_Rotation, WheelSpeed_RR_Rotation Rotation direction of each wheel.

Values

TABLE 25

| Value | Description | Remarks |
|---|---|---|
| 0 | Forward | |
| 1 | Reverse | |
| 2 | Reserved | |
| 3 | Invalid value | The sensor is invalid. |

Remarks

After activation of ECU, until the rotation direction is fixed, "Forward" is set to this signal.

When detected continuously 2 (two) pulses with the same direction, the rotation direction will be fixed.

3.3.3.24. Actual_Moving_Direction

Rotation direction of wheel

Values

TABLE 26

| Value | Description | Remarks |
|---|---|---|
| 0 | Forward | |
| 1 | Reverse | |
| 2 | Standstill | |
| 3 | Undefined | |

Remarks

This signal shows "Standstill" when four wheel speed values are "0" during a constant time.

When other than above, this signal will be determined by the majority rule of four WheelSpeed_Rotations.

When more than two WheelSpeed_Rotations are "Reverse", this signal shows "Reverse".

When more than two WheelSpeed_Rotations are "Forward", this signal shows "Forward".

When "Forward" and "Reverse" are the same counts, this signal shows "Undefined".

3.3.3.25. Longitudinal_Velocity

Estimated longitudinal velocity of vehicle

Values

TABLE 27

| Value | Description | Remarks |
|---|---|---|
| others | Velocity [unit: m/s] | |
| Maximum Value | Invalid value | The sensor is invalid. |

Remarks

This signal is output as the absolute value.

3.3.3.26. Longitudinal_Acceleration

Estimated longitudinal acceleration of vehicle

Values

TABLE 28

| Value | Description | Remarks |
|---|---|---|
| others | Acceleration [unit: m/s$^2$] | |
| Minimum Value | invalid value | The sensor is invalid. |

Remarks

This signal will be calculated with wheel speed sensor and acceleration sensor.

When the vehicle is driven at a constant velocity on the flat road, this signal shows "0".

3.3.3.27. Lateral_Acceleration

Sensor value of lateral acceleration of vehicle.

Values

TABLE 29

| Value | Description | Remarks |
|---|---|---|
| others | Acceleration [unit: m/s$^2$] | |
| Maximum Value | Invalid value | The sensor is invalid. |

Remarks

The positive value means counterclockwise. The negative value means clockwise.

3.3.3.28. Yawrate

Sensor value of Yaw rate.

Values

TABLE 30

| Value | Description | Remarks |
|---|---|---|
| others | Yaw rate [unit: deg/s] | |
| Maximum Value | Invalid value | The sensor is invalid. |

Remarks

The positive value means counterclockwise. The negative value means clockwise.

3.3.3.29. Autonomy_State

State of whether autonomy mode or manual node

Values

TABLE 31

| Value | Description | Remarks |
|---|---|---|
| 00 | Manual Mode | The mode starts from Manual mode. |
| 01 | Autonomous Mode | |

Remarks

The initial state is the Manual mode. (When Ready ON, the vehicle will start from the Manual mode.)

Autonomy Ready

Situation of whether the vehicle can transition to autonomy mode or not

Values

TABLE 32

| Value | Description | Remarks |
|---|---|---|
| 00b | Not Ready For Autonomy | |
| 01b | Ready For Autonomy | |
| 1ib | Invalid | means the status is not determined. |

Remarks

This signal is a part of transition conditions toward the Autonomy mode.

Please see the summary of conditions.

3.3.3.31. Autonomy_Fault

Status of whether the fault regarding a functionality in autonomy mode occurs or not Values

TABLE 33

| Value | Description | Remarks |
|---|---|---|
| 00b | No fault | |
| 01b | Fault | |
| 11b | Invalid | means the status is not determined. |

Remarks

[T.B.D.] Please see the other material regarding the fault codes of a functionality in autonomy mode.

[T.B.D.] Need to consider the condition to release the status or "fault".

3.4. APIs for BODY control

3.4.1. Functions

T.B.D.

3.4.2. Inputs

TABLE 34

| Signal Name | Description | Redundancy |
|---|---|---|
| Turnsignallight_Mode_Command | Command to control the turnsignallight mode of the vehicle platform | N/A |
| Headlight_Mode_Command | Command to control the headlight mode of the vehicle platform | N/A |
| Hazardlight_Mode_Command | Command to controt the hazardlight mode of the vehicle platform | N/A |
| Horn_Pattern_Command | Command to control the pattern of horn ON-time and OFF-time per cycle of the vehicle platform | N/A |
| Horn_Number_of_Cycle_Command | Command to control the Number of horn ON/OFF cycle of the vehicle platform | N/A |
| Horn_Continuous_Command | Command to control of horn ON of the vehicle platform | N/A |
| Windshieldwiper_Mode_Front_Command | Command to control the front windshield wiper of the vehicle platform | N/A |
| Windshieldwiper_Intermittent_Wiping_Speed_Command | Command to control the Windshield wiper actuation interval at the Intermittent mode | N/A |
| Windshieldwiper_Mode_Rear_Command | Command to control the rear windshield wiper mode of the vehicle platform | N/A |
| Hvac_1st_Command | Command to start/stop 1st row air conditioning control | N/A |
| Hvac_2nd_Command | Command to start/stop 2nd row air conditioning control | N/A |
| Hvac_TargetTemperature_1st_Left_Command | Command to set the target temperature around front left area | N/A |
| Hvac_TargetTemperature_1st_Right_Command | Command to set the target temperature around front right area | N/A |
| Hvac_TargetTemperatore_2nd_Left_Command | Command to set the target temperature around rear left area | N/A |
| Hvac_TargetTemperature_2nd_Right_Command | Command to set the target temperature around rear right area | N/A |
| Hvac_Fan_Level_1st_Row_Command | Command to set the fan level on the front AC | N/A |
| Hvac_Fan_Level_2nd_Row_Command | Command to set the fan level on the rear AC | N/A |

TABLE 34-continued

| Signal Name | Description | Redundancy |
| --- | --- | --- |
| Hvac_1st_Row_AirOutlet_Mode_Command | Command to set the mode of 1st row air outlet | N/A |
| Hvac_2nd_Row_AirOutlet_Mode_Command | Command to set the mode of 2nd row air outlet | N/A |
| Hvac_Recirculate_Command | Command to set the air recirculation mode | N/A |
| Hvac_AC_Command | Command to set the AC mode | N/A |

3.4.2.1. Turnsignallight_Mode_Command

Command to control the turnsignallight mode of the vehicle platform

Values

TABLE 35

| value | Description | remarks |
| --- | --- | --- |
| 0 | OFF | Blinker OFF |
| 1 | Right | Right blinker ON |
| 2 | Left | Left blinker ON |
| 3 | reserved | |

Remarks

T.B.D.

Detailed Design

When Turnsignallight_Mode_Command=1, vehicle platform sends left blinker on request.

When Turnsignallight_Mode_Command=2, vehicle platform sends right blinker on request.

3.4.2.2. Headlight_Mode_Command

Command to control the headlight mode of the vehicle platform

Values

TABLE 36

| Value | Description | remarks |
| --- | --- | --- |
| 0 | No Request | Keep current mode |
| 1 | TAIL mode request | side lamp mode |
| 2 | HEAD mode request | Lo mode |
| 3 | AUTO mode request | |
| 4 | HI mode request | |
| 5 | OFF Mode Request | |
| 6-7 | reserved | |

Remarks

This command is valid when Headlight_Driver_Input=OFF or Auto mode ON.

Driver input overrides this command.

Headlight mode changes when Vehicle platform receives once this command.

3.4.2.3. Hazardlight_Mode_Command

Command to control the hazardlight mode of the vehicle platform

Values

TABLE 37

| value | Description | remarks |
| --- | --- | --- |
| 0 | OFF | command for hazardlight OFF |
| 1 | ON | command for hazardlight ON |

Remarks

Driver ingot overrides this command.

Hazardlight is active during Vehicle Platform receives ON command.

3.4.2.4. Horn_Pattern_Command

Command to control the pattern of horn ON-time and OFF-time per cycle of the vehicle platform Values

TABLE 38

| value | Description | remarks |
| --- | --- | --- |
| 0 | NO request | |
| 1 | Pattern 1 | ON-time: 250 ms OFF-time: 750 ms |
| 2 | Pattern 2 | ON-time: 500 ms OFF-time: 500 ms |
| 3 | Pattern 3 | reserved |
| 4 | Pattern 4 | reserved |
| 5 | Pattern 5 | reserved |
| 6 | Pattern 6 | reserved |
| 7 | Pattern 7 | Reserved |

Remarks

Pattern 1 is assumed to use single short ON, Pattern 2 is assumed to use ON-OFF repeating.

Detail is under internal discussion.

3.4.2.5. Horn_Number_of_Cycle_Command

Command to control the Number of horn ON/OFF cycle of the vehicle platform

Values 0-7 [–]

Remarks

Detail is under internal discussion.

3.4.2.6. Horn_Continous_Command

Command to control of horn ON of the vehicle platform

Values

TABLE 39

| value | Description | remarks |
| --- | --- | --- |
| 0 | No request | |
| 1 | ON request | |

Remarks

This command overrides Horn_Pattern_Command, Horn_Number_of_Cycle_Command.

Horn is active during Vehicle Platform receives ON command.

Detail is under internal discussion.

3.4.2.7. Windshieldwiper_Mode_Front_Command

Command to control the front windshield wiper of the vehicle platform

Values

TABLE 40

| value | Description | remarks |
|---|---|---|
| 0 | OFF mode request | |
| 1 | LO mode request | |
| 2 | Hi mode request | |
| 3 | Intermittent mode request | |
| 4 | Auto mode request | |
| 5 | Mist mode request | One-Time Wiping |
| 6, 7 | Reserved | |

Remarks

This command is under internal discussion the timing of valid.

This command is valid when Windshieldwiper_Front_Driver_Input=OFF or Auto mode ON.

Driver input overrides this command.

Windshieldwiper mode is kept during Vehicle platform is receiving the command.

3.4.2.8 Windshieldwiper_Intermittent_Wiping_Speed_Command

Command to control the Windshield wiper actuation interval at the Intermittent mode Values

TABLE 41

| value | Description | remarks |
|---|---|---|
| 0 | FAST | |
| 1 | SECOND FAST | |
| 2 | THIRD FAST | |
| 3 | SLOW | |

Remarks

This command is valid when Windshieldwiper_Mode_Front_Status=INT.

Driver input overrides this command.

Windshieldwiper intermittent mode changes when Vehicle platform receives once this command.

Windshieldwiper_Mode_Rear_Command

Command to control the rear windshield wiper mode of the vehicle platform

Values

TABLE 42

| value | Description | Remarks |
|---|---|---|
| 0 | OFF mode request | |
| 1 | Lo mode request | |
| 2 | reserved | |
| 3 | Intermittent mode request | |
| 4-7 | reserved | |

Remarks

Driver input overrides this command.

Windshieldwiper mode is kept during Vehicle platform is receiving the command.

Wiping speed of intermittent mode is not variable.

3.4.2.10. Hvac_1st_Command

Command to start/stop 1st row air conditioning control.

Values

TABLE 43

| value | Description | Remarks |
|---|---|---|
| 00 | No request | |
| 01 | ON | means turning the 1st air conditioning control to ON |
| 02 | OFF | means turning the 1st air conditioning control to OFF |

Remarks

The hvac of S-AM has a synchronization functionality.

Therefore, in order to control 4 (four) hvacs (1st_left/right, 2nd_left/right) individually, VCIB achieves the following procedure after Ready-ON. (This functionality will be implemented from the CV.)

1: Hvac_1st_Command=ON
2: Hvac_2nd_Command=ON
3: Hvac_TargetTemperature_2nd_Left_Command
4: Hvac_TargetTemperature_2nd_Right_Command
5: Hvac_Fan_Level_2nd_Row_Command
6: Hvac_2nd_Row_AirOutlet_Mode_Command
7: Hvac_TargetTemperature_1st_Left_Command
8: Hvac_TargetTemperature_1st_Right_Command
9: Hvac_Fan_Level_1st_Row_Command
10: Hvac_1st_Row_AirOutlet_Mode_Command The interval between each command needs 200 ms or more.

Other commands are able to be executed after #1.

3.4.2.11 Hvac_2nd_Command

Command to start/stop 2nd row air conditioning control.

Values

TABLE 44

| value | Description | Remarks |
|---|---|---|
| 00 | No request | |
| 01 | ON | means turning the 2nd air conditioning control to ON |
| 02 | OFF | means turning the 2nd air conditioning control to OFF |

Remarks

N/A 3.4.2.12. Hvac_TargetTemperature_1st_Left_Command

Command to set the target temperature around front left area.

Values

TABLE 45

| value | Description | Remarks |
|---|---|---|
| 0 | No request | |
| 60 to 85 [unit: ° F.] (by 1.0° F.) | Temperature direction | |

Remarks

N/A 3.4.2.13. Hvac_TargetTemperature_1st_Right_Command

Command to set the target temperature around front right area

Values

TABLE 46

| value | Description | Remarks |
|---|---|---|
| 0 | No request | |
| 60 to 85 [unit: ° F.] (by 1.0° F.) | Temperature direction | |

Remarks
N/A 3.4.2.14. Hvac_TargetTemperature_2nd_Left_Command
Command to set the target temperature around rear left area
Values

TABLE 47

| value | Description | Remarks |
|---|---|---|
| 0 | No request | |
| 60 to 85 [unit: ° F.] (by 1.0° F.) | Temperature direction | |

Remarks
N/A 3.4.2.14. Hvac_TargetTemperature_2nd_Right_Command
Command to set the target temperature around rear right area
Values

TABLE 48

| value | Description | Remarks |
|---|---|---|
| 0 | No request | |
| 60 to 85 [unit: ° F.] (by 1.0° F.) | Temperature direction | |

Remarks
N/A 3.4.2.16. Hvac_Fan_Level_1st_Row_Command
Command to set the fan level on the front AC.
Values

TABLE 49

| value | Description | Remarks |
|---|---|---|
| 0 | No request | |
| 1 to 7 (Maximum) | Fan level direction | |

Remarks
If you would like to turn the fan level to 0 (OFF), you should transmit "Hvac_1st_Command=OFF".
If you would like to turn the fan level to AUTO, you should transmit "Hvac_1st_Command=ON".

3.4.2.17. Hvac_Fan_Level_2nd_Row_Command
Command to set the fan level on the rear AC
Values

TABLE 50

| value | Description | Remarks |
|---|---|---|
| 0 | No request | |
| 1 to 7 (Maximum) | Fan level direction | |

Remarks
If you would like to turn the fan level to 0 (OFF), you should transmit "Hvac_2nd_Command=OFF".
If you would like to turn the fan level to AUTO, you should transmit "Hvac_2nd_Command=ON".

3.4.2.18. Hvac_1st_Row_AirOutlet_Mode_Command
Command to set the mode of 1st row air outlet
Values

TABLE 51

| value | Description | Remarks |
|---|---|---|
| 000b | No Operation | |
| 001b | UPPER | Air flows to the upper body |
| 010b | U/F | Air flows to the upper body and feet |
| 011b | FEET | Air flows to the feet. |
| 100b | F/D | Air flows to the feet and the windshield defogger operates |

Remarks
N/A 3.4.2.19. Hvac_2nd_Row_AirOutlet_Mode_CommandCommand to set the mode of 2nd row air outlet
Values

TABLE 52

| value | Description | Remarks |
|---|---|---|
| 000b | No Operation | |
| 001b | UPPER | Air flows to the upper body |
| 010b | U/F | Air flows to the upper body and feet |
| 011b | FEET | Air flows to the feet. |

Remarks
N/A 3.4.2/20. Hvac_Recirculate_Command
Command to set the air recirculation mode
Values

TABLE 53

| value | Description | Remarks |
|---|---|---|
| 00 | No request | |
| 01 | ON | means turning the air recirculation mode ON |
| 02 | OFF | means turning the air recirculation mode OFF |

Remarks
N/A 3.4.2.21. Hvac_AC_Command
Command to set the AC mode
Values

TABLE 54

| value | Description | remarks |
|---|---|---|
| 00 | No request | |
| 01 | ON | means turning the AC mode ON |
| 02 | OFF | means turning the AC mode OFF |

Remarks.
N/A 3.4.3. Outputs

TABLE 55

| Signal Name | Description | Redundancy |
|---|---|---|
| Turnsignallight_Mode_Status | Status of the current turnsignallight mode of the vehicle platform | N/A |
| Headlight_Mode_Status | Status of the current headlight mode of the vehicle platform | N/A |
| Hazardlight_Mode_Status | Status of the current hazardlight mode of the vehicle platform | N/A |
| Horn_Status | Status of the current horn of the vehicle platform | N/A |
| Windshieldwiper_Mode_Front_Status | Status of the current front windshield wiper mode of the vehicle platform | N/A |
| Windshieldwiper_Mode_Rear_Status | Status of the current rear windshield wiper mode of the vehicle platform | N/A |
| Hvac_$1^{st}$_Status | Status of activation of the $1^{st}$ row HVAC | N/A |
| Hvac_$2^{nd}$_Status | Status of activation of the $2^{nd}$ row HVAC | N/A |
| Hvac_Temperature_$1^{st}$_Left_Status | Status of set temperature of $1^{st}$ row left | N/A |
| Hvac_Temperature_$1^{st}$_Right_Status | Status of set temperature of $1^{st}$ row right | N/A |
| Hvac_Temperature_$2^{nd}$_Left_Status | Status of set temperature of $2^{nd}$ row left | N/A |
| Hvac_Temperature_$2^{nd}$_Right_Status | Status of set temperature of $2^{nd}$ row right | N/A |
| Hvac_Fan_Level_$1^{st}$_Row_Status | Status of set fan level of $1^{st}$ row | N/A |
| Hvac_Fan_Level_$2^{nd}$_Row_Status | Status of set fan level of $2^{nd}$ row | N/A |
| Hvac_1st_Row_AirOutlet_Mode_Status | Status of mode of 1st row air outlet | N/A |
| Hvac_2nd_Row_AirOutlet_Mode_Status | Status of mode of 2nd row air outlet | N/A |
| Hvac_Recirculate_Status | Status of set air recirculation mode | N/A |
| Hvac_AC_Status | Status of set AC mode | N/A |
| 1st_Right_Seat_Occupancy_Status | Seat occupancy status in 1st left seat | — |
| 1st_Left_Seat_Belt_Status | Status of driver's seat belt buckle switch | — |
| 1st_Right_Seat_Belt_Status | Status of passenger's seat belt buckle switch | — |
| 2nd_Left_Seat_Belt_Status | Seat belt buckle switch status in 2nd left seat | — |
| 2nd_Right_Seat_Belt_Status | Seat belt buckle switch status in 2nd right seat | — |

3.4.3.1. Turnsignallight_Mode_Status
Status of the current turnsignallight mode of the vehicle platform
Values

TABLE 56

| value | Description | Remarks |
|---|---|---|
| 0 | OFF | Turn lamp = OFF |
| 1 | Left | Turn lamp L = ON (flashing) |
| 2 | Right | Turn lamp R = ON (flashing) |
| 3 | invalid | |

Remarks
At the time of the disconnection detection of the turn lamp, state is ON.
At the time of the short detection of the turn lamp, State is OFF.

3.4.3.2. Headlight_Mode_Status
Status of the current headlight mode of the vehicle platform
Values

TABLE 57

| Value | Description | Remarks |
|---|---|---|
| 0 | OFF | |
| 1 | TAIL | |
| 2 | Lo | |
| 3 | reserved | |
| 4 | Hi | |
| 5-6 | reserved | |
| 7 | invalid | |

Remarks
N/A
Detailed Design
At the time of tail signal ON, Vehicle Platform sends 1.
At the time of Lo signal ON, Vehicle Platform sends 2.
At the time of Hi signal ON, Vehicle Platform sends 4.
At the time of any signal above OFF, Vehicle Platform sends 0.

3.4.3.3. Hazardlight_Mode_Status
Status of the current hazard lamp mode of the vehicle platform
Values

TABLE 58

| Value | Description | Remarks |
|---|---|---|
| 0 | OFF | Hazard lamp = OFF |
| 1 | Hazard | Hazard lamp = ON (flashing) |
| 2 | reserved | |
| 3 | invalid | |

Remarks
N/A 3.4.3.4. Horn_Status
Status of the current horn of the vehicle platform
Values

TABLE 59

| Value | Description | Remarks |
|---|---|---|
| 0 | OFF | |
| 1 | ON | |

TABLE 59-continued

| Value | Description | Remarks |
|---|---|---|
| 2 | reserved (unsupport) | |
| 3 | invalid (unsupport) | |

Remarks
cannot detect any failure.
Vehicle platform sends "1" during Horn Pattern Command is active, if the horn is OFF.

3.4.3.5. Windshieldwiper_Mode_Front_Status
Status of the current front windshield wiper mode of the vehicle platform
Values

TABLE 60

| Value | Description | Remarks |
|---|---|---|
| 0 | OFF | Front wiper stopped |
| 1 | Lo | Front wiper being active in LO mode (also including being active in MIST, being active in coordination with washer, and being wiping at speed other than HI) |
| 2 | Hi | Front wiper being active in HI mode |
| 3 | INT | Front wiper being active in INT mode (also including motor stop while being active in INT mode and being active in INT mode owing to vehicle speed change function) |
| 4-5 | reserved | |
| 6 | fail | Front wiper failed |
| 7 | invalid | |

TABLE 61

| Value | Description | Remarks |
|---|---|---|
| 0 | OFF | Front wiper is stopped. |
| 1 | Lo | Front wiper is in LO mode (include in MIST mode, operation with washer, Medium speed). |
| 2 | Hi | Front wiper is in HI mode. |
| 3 | INT | Front wiper is in INT mode (include motor stopped between INT mode, INT operation of vehicle speed change function). |
| 4-5 | reserved | |
| 6 | fail | Front wiper is fail. |
| 7 | invalid | |

Remarks
Fail Mode Conditions
detect signal discontinuity
cannot detect except the above failure.

3.4.3.6. Windshieldwiper_Mode_Rear_Status
Status of the current rear windshield wiper mode of the vehicle platform
Values

TABLE 62

| Value | Description | Remarks |
|---|---|---|
| 0 | OFF | Rear wiper stopped |
| 1 | Lo | Rear wiper being in LO mode |
| 2 | reserved | |
| 3 | INT | Rear wiper being in INT mode |
| 4-5 | reserved | |

TABLE 62-continued

| Value | Description | Remarks |
|---|---|---|
| 6 | fail | Rear wiper failed |
| 7 | invalid | |

Remarks
cannot detect any failure.

3.4.3.7. Hvac_1st_Status
Status of activation of the 1st row HVAC
Values

TABLE 63

| value | Description | remarks |
|---|---|---|
| 0b | OFF | |
| 1b | ON | |

Remarks
N/A 3.4.3.8. Hvac_2nd_Status
Status of activation of the 2nd row HVAC
Values

TABLE 64

| value | Description | remarks |
|---|---|---|
| 0b | OFF | |
| 1b | ON | |

Remarks
N/A 3.4.3.9. Hvac_Temperature_1st_Left_Status
Status of set temperature of 1st row left
Values

TABLE 65

| value | Description | remarks |
|---|---|---|
| 0 | Lo | Max cold |
| 60 to 85 [unit: ° F.] | Target temperature | |
| 100 | Hi | Max hot |
| FFh | Unknown | |

Remarks 3.4.3.10. Hvac_Temperature_1st_Right_Status
Status of set temperature of 1st row right
Values

TABLE 66

| value | Description | remarks |
|---|---|---|
| 0 | Lo | Max cold |
| 60 to 85 [unit: ° F.] | Target temperature | |
| 100 | Hi | Max hot |
| FFh | Unknown | |

Remarks
N/A 3.4.3.11. Hvac_Temperature_2nd_Left_Status
Status of set temperature of 2nd row left
Values

TABLE 67

| value | Description | remarks |
|---|---|---|
| 0 | Lo | Max cold |
| 60 to 85 [unit: ° F.] | Target temperature | |
| 100 | Hi | Max hot |
| FFh | Unknown | |

Remarks
N/A 3.4.3.11. Hvac_Temperature_2nd_Right_Status
Status of set temperature of 2nd row right
Values

TABLE 68

| value | Description | remarks |
|---|---|---|
| 0 | Lo | Max cold |
| 60 to 85 [unit: ° F.] | Target temperature | |
| 100 | Hi | Max hot |
| FFh | Unknown | |

Remarks
N/A 3.4.3.13. Hvac_Fan_Level_1st_Row_Status
Status of set fan level of 1st row
Values

TABLE 69

| value | Description | remarks |
|---|---|---|
| 0 | OFF | |
| 1-7 | Fan Level | |
| 8 | Undefined | |

Remarks 3.4.3.13. Hvac_Fan_Level_2nd_Row_Status
Status of set fan level of 2nd row
Values

TABLE 70

| value | Description | remarks |
|---|---|---|
| 0 | OFF | |
| 1-7 | Fan Level | |
| 8 | Undefined | |

Remarks
N/A 3.4.3.15. Hvac_1st_Row_AirOutlet_Mode_Status
Status of mode of 1st row air outlet
Values

TABLE 71

| value | Description | remarks |
|---|---|---|
| 000b | ALL OFF | when Auto mode is set |
| 001b | UPPER | Air flows to the upper body |
| 010b | U/F | Air flows to the upper body and feet |
| 011b | FEET | Air flows to the feet. |
| 100b | F/D | Air flows to the feet and the windshield defogger operates |
| 101b | DEF | The windshield defogger operates |
| 111b | Undefined | |

Remarks
N/A 3.4.3.17. Hvac_2nd_Row_AirOutlet_Mode_Status
Status of mode of 2nd row air outlet
Values

TABLE 72

| value | Description | remarks |
|---|---|---|
| 000b | ALL OFF | when Auto mode is set |
| 001b | UPPER | Air flows to the upper body |
| 010b | U/F | Air flows to the upper body and feet |
| 011b | FEET | Air flows to the feet. |
| 111b | Undefined | |

Remarks
N/A
3.4.3.17. Hvac_Recirculate_Status
Status of set air recirculation mode
Values

TABLE 73

| value | Description | remarks |
|---|---|---|
| 00 | OFF | means that the air recirculation mode is OFF |
| 01 | ON | means that the air recirculation mode is ON |

Remarks
N/A
3.4.3.18. Hvac_AC_Status
Status of set AC mode
Values

TABLE 74

| value | Description | remarks |
|---|---|---|
| 00 | OFF | means that the AC mode is OFF |
| 01 | ON | means that the AC mode is ON |

Remarks
N/A
3.4.3.19. 1st_Right_Seat_Occupancy_Status
Seat occupancy status in 1st left seat
Values

TABLE 75

| value | Description | remarks |
|---|---|---|
| 0 | Not occupied | |
| 1 | Occupied | |
| 2 | Undecided | IG OFF or signal from sensor being lost |
| 3 | Failed | |

Remarks
When there is luggage on the seat, this signal may be set to "Occupied".
3.4.3.20. 1st_Left_Belt_Status
Status of driver's seat belt buckle switch
Values

TABLE 76

| value | Description | remarks |
|---|---|---|
| 0 | Buckled | |
| 1 | Unbuckled | |
| 2 | Undetermined | |
| 3 | Fault of a switch | |

Remarks
When Driver's seat belt buckle switch status signal is not set, [undetermined] is transmitted.
It is checking to a person in charge, when using it (Outputs "undetermined=10" as an initial value.)
The judgement result of buckling/unbuckling shall be transferred to CAN transmission buffer within 1.3 s after IG_ON or before allowing firing, whichever is earlier.
3.4.3.21. 1st_Right_Seat_Belt_Status
Status of passenger's seat belt buckle switch
Values

TABLE 77

| value | Description | remarks |
|---|---|---|
| 0 | Buckled | |
| 1 | Unbuckled | |
| 2 | Undetermined | |
| 3 | Fault of a switch | |

Remarks
When Passenger's seat belt buckle switch status signal is not set, [undetermined] is transmitted.
It is checking to a person in charge, when using it, (Outputs "undetermined=10" as an initial value.)
The judgement result of buckling/unbuckling shall be transferred to CAN transmission buffer within 1.3 s after IG_ON or before allowing firing, whichever is earlier.
3.4.3.22. 2nd_Left_Seat_Belt_Status
Seat belt buckle switch status in 2nd left seat
Values

TABLE 78

| value | Description |
|---|---|
| 0 | Buckled |
| 1 | Unbuckled |
| 2 | Undetermined |
| 3 | Reserved |

Remarks
cannot detect sensor failure.
3.4.3.23. 2nd_Right_Seat_Belt_Status
Seat bell buckle switch status in 2nd right seat
Values

TABLE 79

| value | Description | remarks |
|---|---|---|
| 0 | Buckled | |
| 1 | Unbuckled | |
| 2 | Undetermined | |
| 3 | Reserved | |

Remarks
cannot detect any failure.
3.5. APIs for Power Control
3.5.1. Functions
T.B.D.

3.5.2. Inputs

TABLE 80

| Signal Name | Description | Redundancy |
|---|---|---|
| Power_Mode_Request | Command to control the power mode of the vehicle platform | N/A |

3.5.2.1. Power_Mode_Request

Command to control the power mode of the vehicle platform

Values

TABLE 81

| Value | Description | Remarks |
|---|---|---|
| 00 | No request | |
| 01 | Sleep | means "Ready OFF" |
| 02 | Wake | means that VCIB turns ON |
| 03 | Resd | Reserved for data expansion |
| 04 | Resd | Reserved for data expansion |
| 05 | Resd | Reserved for data expansion |
| 06 | Driving Mode | means "Ready ON" |

Remarks

Regarding "wake", let us share how to achieve this signal on the CAN. (See the other material) Basically, it is based on "ISO11989-2:2016". Also, this signal should not be a simple value. Anyway, please see the other material.

This API will reject the next request for a certain time [4000 ms] after receiving a request.

The followings are the explanation of the three power modes, i.e. [Sleep][Wake][Driving Model], which are controllable via API.

[Sleep]

Vehicle power off condition. In this mode, the high voltage battery does not supply power, and neither VCIB nor other VP ECUs are activated.

[Wake]

VCIB is awake by the low voltage battery. In this mode, ECUs other than VCIB are not awake except for some of the body electrical ECUs.

[Driving Model]

Ready ON mode. In this mode, the high voltage battery supplies power to the whole VP and all the VP ECUs including VCIB are awake.

3.5.3. Outputs

TABLE 82

| Signal Name | Description | Redundancy |
|---|---|---|
| Power_Mode_Status | Status of the current power mode of the vehicle platform | N/A |

3.5.3.1. Power_Mode_Status

Status of the current power mode of the vehicle platform

Values

TABLE 83

| Value | Description | Remarks |
|---|---|---|
| 00 | Resd | Reserved for same data align as mode request |
| 01 | Sleep | means "Ready OFF" |
| 02 | Wake | means that the only VCIB turns ON |
| 03 | Resd | Reserved for data expansion |

TABLE 83-continued

| Value | Description | Remarks |
|---|---|---|
| 04 | Resd | Reserved for data expansion |
| 05 | Resd | Reserved for data expansion |
| 06 | Driving Mode | means "Ready ON" |
| 07 | unknown | means unhealthy situation would occur |

Remarks

VCIB will transmit [Sleep] Power_Mode_Status continuously for 3000 [ms] after executing the sleep sequence. And then, VCIB will be shutdown.

3.6. APIs for Safety

3.6.1. Functions

T.B.D.

3.6.2. Inputs

TABLE 84

| Signal Name | Description | Redundancy |
|---|---|---|
| T.B.D. | | |

3.6.3. Outputs

TABLE 85

| Signal Name | Description | Redundancy |
|---|---|---|
| Request for Operation | Request for operation according to status of vehicle platform toward ADS | |
| Passive_Safety_Functions_Triggered | Collision detection signal | — |
| Brake_System_Degradation_Modes | Indicates Brake_System_Degradation_Modes | Applied |
| Propulsive_System_Degradation_Modes | Indicates Propulsive_System_Degradation_Modes | N/A |
| Direction_Control_Degradation_Modes | Indicates Direction_Control_Degradation_Modes | N/A |
| WheelLock_Control_Degradation_Modes | Indicates WheelLock_Control_Degradation_Modes | Applied |
| Steering_System_Degradation_Modes | Indicates Steering_System_Degradation_Modes | Applied |
| Power_System_Degradation_Modes | Indicates Power_System_Degradation_Modes | Applied |
| Communication_Degradation_Modes | | |

3.6.3.1. Request for Operation Request for operation according to status of vehicle platform toward ADS Values

TABLE 86

| value | Description | remarks |
|---|---|---|
| 0 | No request | |
| 1 | Need maintenance | |
| 2 | Need back to garage | |
| 3 | Need stopping safely immediately | |
| Others | Reserved | |

Remarks

T.B.D.

3.6.3.2. Passive_Safety_Functions_Triggered
Crash detection Signal
Values

TABLE 87

| value | Description | remarks |
|---|---|---|
| 0 | Normal | |
| 5 | Crash Detection (airbag) | |
| 6 | Crash Detection (high voltage circuit is shut off) | |
| 7 | Invalid Value | |
| Others | Reserved | |

Remarks
When the event of crash detection is generated, the signal is transmitted 50 consecutive times every 100 [ms]. If the crash detection state changes before the signal transmission is completed, the high signal of priority is transmitted.
Priority: crash detection>normal
Transmits for 5 s regardless of ordinary response at crash, because the vehicle breakdown judgment system shall send a voltage OFF request for 5 s or less after crash in HV vehicle.
Transmission interval is 100 ms within fuel cutoff motion delay allowance time (1 s) so that data can be transmitted more than 5 times. In this case, an instantaneous power interruption is taken into account,
3.6.3.3. Brake_System_Degradation_Modes
Indicate Brake_System status
Values

TABLE 88

| value | Description | remarks |
|---|---|---|
| 0 | Normal | — |
| 1 | Failure detected | — |

Remarks
When the Failure is detected, Safe stop is moved.
3.6.3.4. Propulsive_System_Degradation_Modes
Indicate Powertrain_System status.
Values

TABLE 9

| value | Description | remarks |
|---|---|---|
| 0 | Normal | — |
| 1 | Failure detected | — |

Remarks
When the Failure is detected, Safe stop is moved.
3.6.3.5. Direction_Control_Degradation_Modes
Indicate Direction_Control status
Values

TABLE 90

| value | Description | remarks |
|---|---|---|
| 0 | Normal | — |
| 1 | Failure detected | — |

Remarks
When the Failure is detected, Safe stop is moved.
When the Failure is detected, Propulsion Direction Command is refused.

3.6.3.6. Wheel_Lock_Control_Degradation_Modes
Indicate WheelLock_Control status
Values

TABLE 91

| value | Description | remarks |
|---|---|---|
| 0 | Normal | — |
| 1 | Failure detected | — |

Remarks
Primary indicates EPB status, and Secondary indicates SBW indicates.
When the Failure is detected, Sale stop is moved.
3.6.3.7. Steering_System_Degradation_Modes
Indicate Steering_System status
Values

TABLE 92

| value | Description | remarks |
|---|---|---|
| 0 | Normal | — |
| 1 | Failure detected | — |
| 2 | Stationary steering not possible | Temporary lowering in performance due to high temperature or the like |

Remarks
When the Failure are detected, Safe stop is moved.
3.6.3.8. Power_System_Degradation_Modes
[T.B.D]
3.6.3.9. Communication_Degradation_Modes
3.7. APIs for Security
3.7.1. Functions
T.B.D.
3.7.2. Inputs

TABLE 93

| Signal Name | Description | Redundancy |
|---|---|---|
| 1st_Left_Door_Lock_Command | Command to control each door lock of the vehicle platform | N/A |
| 1st_Right_Door_Lock_Command | Lock command supports only ALL Door Lock. | N/A |
| 2nd_Left_Door_Lock_Command | Unlock command supports 1st-left Door unlock only, and ALL Door unlock. | N/A |
| 2nd_Right_Door_Lock_Command | Trunk Door Lock/unlock command include in ALL Door lock/unlock | N/A |
| Central_Vehicle_Lock_Exterior_Command | Command to control the all door lock of the vehicle platform | N/A |

3.7.2.1. 1st_Left_Door_Lock_Command, 1st_Right_Door_Lock_Command, 2nd_Left_Door_Lock_Command, 2nd_Right_Door_Lock_Command
Command to control each door lock of the vehicle platform
Values

TABLE 94

| Value | Description | Remarks |
|---|---|---|
| 0 | No Request | |
| 1 | Lock (unsupported) | |
| 2 | Unlock | |
| 3 | reserved | |

Remarks

Lock command supports only ALL Door Lock.

Unlock command supports 1st-left Door unlock only, and ALL Door unlock.

3.7.2.2. Central_Vehicle_Lock_Exterior_Command

Command to control the all door lock of the vehicle platform.

Values

TABLE 95

| Value | Description | Remarks |
|---|---|---|
| 0 | No Request | |
| 1 | Lock (all) | include trunk lock |
| 2 | Unlock (all) | include trunk unlock |
| 3 | reserved | |

Remarks

Lock command supports only ALL Door Lock.

Unlock command supports 1st-left Door unlock only, and ALL Door unlock.

3.7.3. Outputs

TABLE 96

| Signal Name | Description | Redundancy |
|---|---|---|
| 1st_Left_Door_Lock_Status | Status of the current 1st-left door lock mode of the vehicle platform | N/A |
| 1st_Right_Door_Lock_Status | Status of the current 1st-right door lock mode of the vehicle platform | N/A |
| 2nd_Left_Door_Lock_Status | Status of the current 2nd-left door lock mode of the vehicle platform | N/A |
| 2nd_Right_Door_Lock_Status | Status of the current 2nd-right door lock mode of the vehicle platform | N/A |
| Central_Vehicle_Exterior_Locked_Status | Status of the current all door lock mode of the vehicle platform | N/A |
| Vehicle_Alarm_Status | Status of the current vehicle alarm of the vehicle platform | N/A |

3.7.3.1. 1st_Left_Door_Lock_Status

Status of the current 1st-left door lock mode of the vehicle platform

Values

TABLE 97

| value | Description | Remarks |
|---|---|---|
| 0 | reserved | |
| 1 | Locked | D seat locked |
| 2 | Unlocked | D seat unocked |
| 3 | invalid | |

Remarks cannot detect any failure.

3.7.3.2. 1st_Right_Door_Lock_Status

Status of the current 1st-right door lock mode of the vehicle platform

Values

TABLE 98

| value | Description | remarks |
|---|---|---|
| 0 | reserved | |
| 1 | Locked | P seat locked |
| 2 | Unlocked | P seat unlocked |
| 3 | invalid | |

Remarks cannot detect any failure.

3.7.3.3. 2nd_Left_Door_Lock_Status

Status of the current 2nd-left door lock mode of the vehicle platform

Values

TABLE 99

| Value | Description | remarks |
|---|---|---|
| 0 | Reserved | |
| 1 | Locked | RL seat locked |
| 2 | Unlocked | RL seat unlocked |
| 3 | invalid | |

Remarks cannot detect any failure 3.7.3.4. 2nd_Right_Door_Lock_Status

Status of the current 2nd-right door lock mode of the vehicle platform

Values

TABLE 100

| value | Description | remarks |
|---|---|---|
| 0 | reserved | |
| 1 | Locked | RR seat locked |
| 2 | Unlocked | RR seat unlocked |
| 3 | invalid | |

Remarks cannot detect any failure.

3.7.3.5. Central_Vehicle_Exterior_Locked_Status

Status of the current all door lock mode of vehicle platform

Values

TABLE 101

| value | Description | remarks |
|---|---|---|
| 0 | Reserved (unsupport) | |
| 1 | All Locked (unsupport) | |
| 2 | Anything Unlocked (unsupport) | |
| 3 | invalid (unsupport) | |

Remarks

Vehicle platform refers to each door lock status, in case any door unlocked, sends 0.

in case all door locked, sends 1.

3.7.3.6. Vehicle_Alarm_Status
Status of the current vehicle alarm of the vehicle platform
Values

TABLE 102

| Value | Description | remarks |
|---|---|---|
| 0 | Disarmed | Auto alarm system not active |
| 1 | Armed | Auto alarm system active-not on alert |
| 2 | Active | Auto alarm system active-on alert |
| 3 | invalid | |

Remarks
N/A
3.8. APIs for MaaS Service
3.8.1. Functions
T.B.D.
3.8.2. Inputs

TABLE 103

| Signal Name | Description | Redundancy |
|---|---|---|
| T.B.D. | | |

3.8.3 Outputs

TABLE 104

| Signal Name | Description | Redundancy |
|---|---|---|
| T.B.D. | | |

Example 2

Toyota's MaaS Vehicle Platform
Architecture Specification
[Standard Edition #0.1]
History of Revision

TABLE 105

| Date of Revision | ver. | Summary of Revision | Reviser |
|---|---|---|---|
| Nov. 4, 2019 | 0.1 | Creating a new material | MaaS Business Div. |

Index.
1. General Concept 4
1.1. Purpose of this Specification 4
1.2. Target Vehicle Type 4
1.3. Target Electronic Platform 4
1.4. Definition of Term 4
1.5. Precaution for Handling, 4
1.6. Overall Structure of MaaS 4
1.7. Adopted Development Process 6
1.8. ODD (Operational Design Domain) 6
2. Safety Concept 7
2.1. Outline 7
2.2. Hazard analysis and risk assessment 7
2.3. Allocation of safety requirements 8
2.4. Redundancy 8
3. Security Concept 10
3.1. Outline 10
3.2. Assumed Risks 10
3.3. Countermeasure for the risks 10
3.3.1. The countermeasure for a remote attack 11
3.3.2. The countermeasure for a modification 11
3.4. Addressing Held Data Information 11
3.5. Addressing Vulnerability 11
3.6. Contract with Operation Entity 11
4. System Architecture 12
4.1. Outline 12
4.2. Physical LAN architecture (in-Vehicle) 12
4.3. Power Supply Structure 4
5. Function Allocation 15
5.1. in a healthy situation 15
5.2. in a single failure 16
6. Data. Collection 18
6.1. At event 18
6.2. Constantly 18
1. General Concept
1.1. Purpose of this Specification
This document is an architecture specification of Toyota's MaaS Vehicle Platform and contains the outline of system in vehicle level.
1.2. Target Vehicle Type
This specification is applied to the Toyota vehicles with the electronic platform called 19ePF [ver.1 and ver.2]
The representative vehicle with 19ePF is shown as follows.
e-Palette, Sienna, RAV4, and so on.
1.3. Definition of Term

TABLE 106

| Term | Definition |
|---|---|
| ADS | Autonomous Driving System. |
| ADK | Autonomous Driving Kit |
| VP | Vehicle Platform. |
| VCIB | Vehicle Control Interface Box. This is an ECU for the interface and the signal converter between ADS and Toyota VP's sub systems. |

Figure 15:
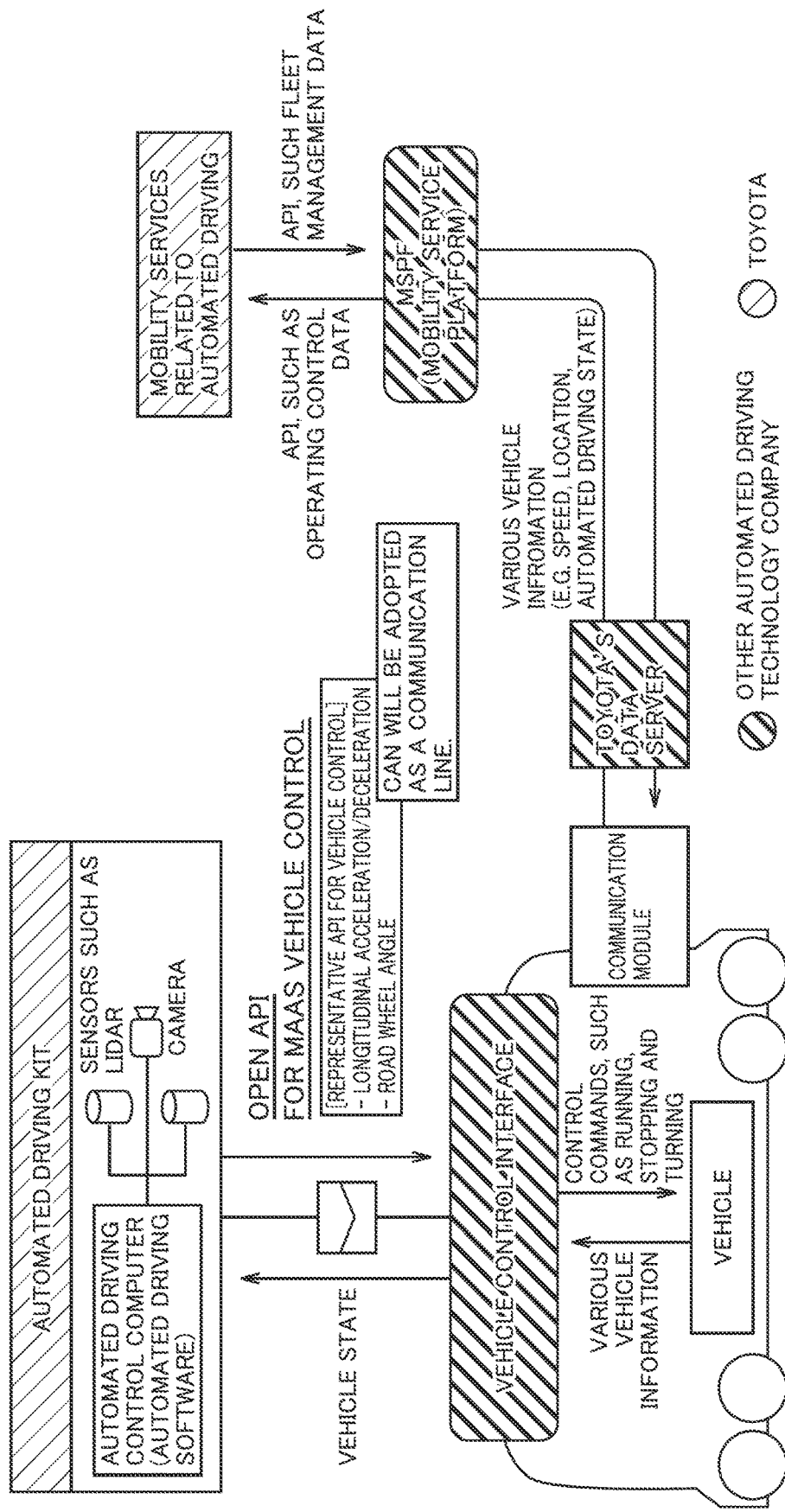
FIG. 15 is a diagram of an overall configuration of MaaS.
Figure 16:
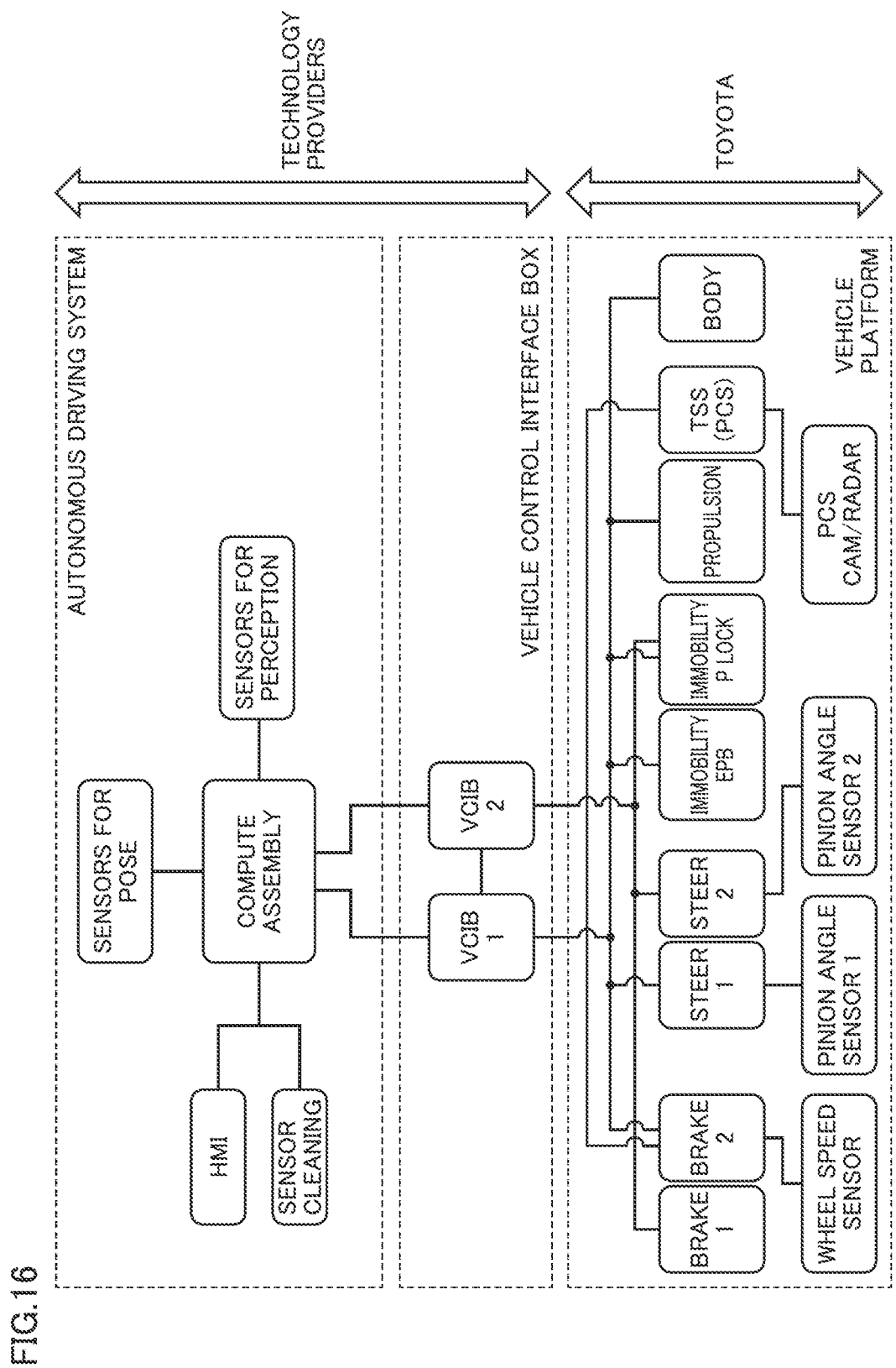
FIG. 16 is a diagram of a system configuration of a vehicle.
Figure 17:
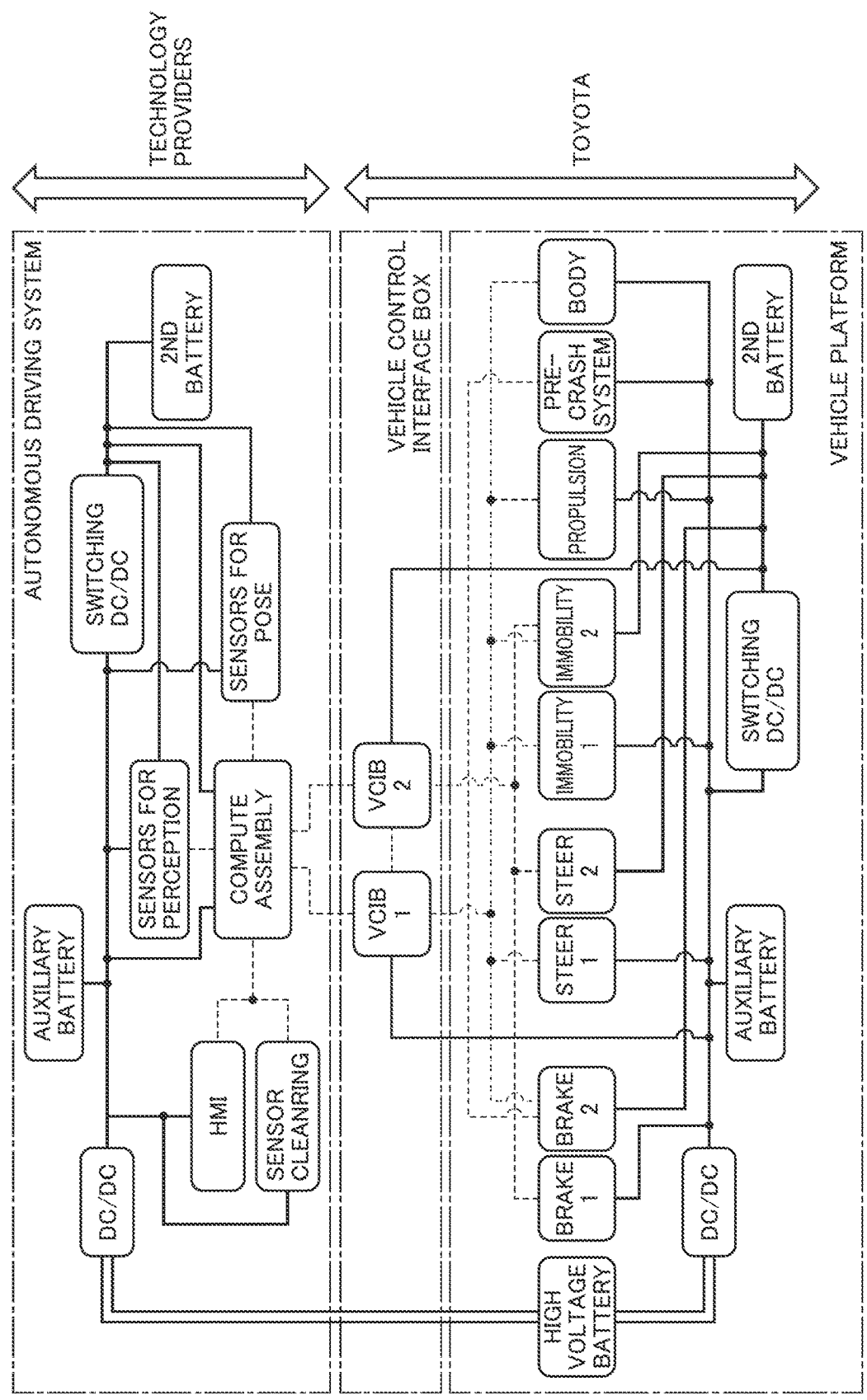
FIG. 17 is a diagram showing a configuration of supply of power of the vehicle.

1.4. Precaution for Handling
This is an early draft of the document.
All the contents are subject to change, Such changes are notified to the users. Please note that some parts are still T.B.D. will be updated in the future.
2. Architectural Concept
2.1. Overall Structure of MaaS
The overall structure of MaaS with the target vehicle is shown (FIG. 15).
Vehicle control technology is being used as an interface for technology providers.
Technology providers can receive open APE such as vehicle state and vehicle control, necessary for development of automated driving systems.
2.2. Outline of System Architecture an the Vehicle
The system architecture on the vehicle as a premise is shown (FIG. 16).
The target vehicle of this document will adopt the physical architecture of using CAN for the bus between ADS and VCIB. In order to realize each API in this document, the CAN frames and the bit assignments are shown in the form of "bit assignment chart" as a separate document.
2.3. Outline of Power Supply Architecture on the Vehicle
The power supply architecture as a premise is shown as follows (FIG. 17).
The blue colored parts are provided from an ADS provider. And the orange colored parts are provided from the VP.

The power structure for ADS is isolate from the power structure for VP. Also, the ADS provider should install a redundant power structure isolated from the VP.

3. Safety Concept 3.1. Overall Safety Concept

The basic safety concept is shown as Follows.

Figure 18:
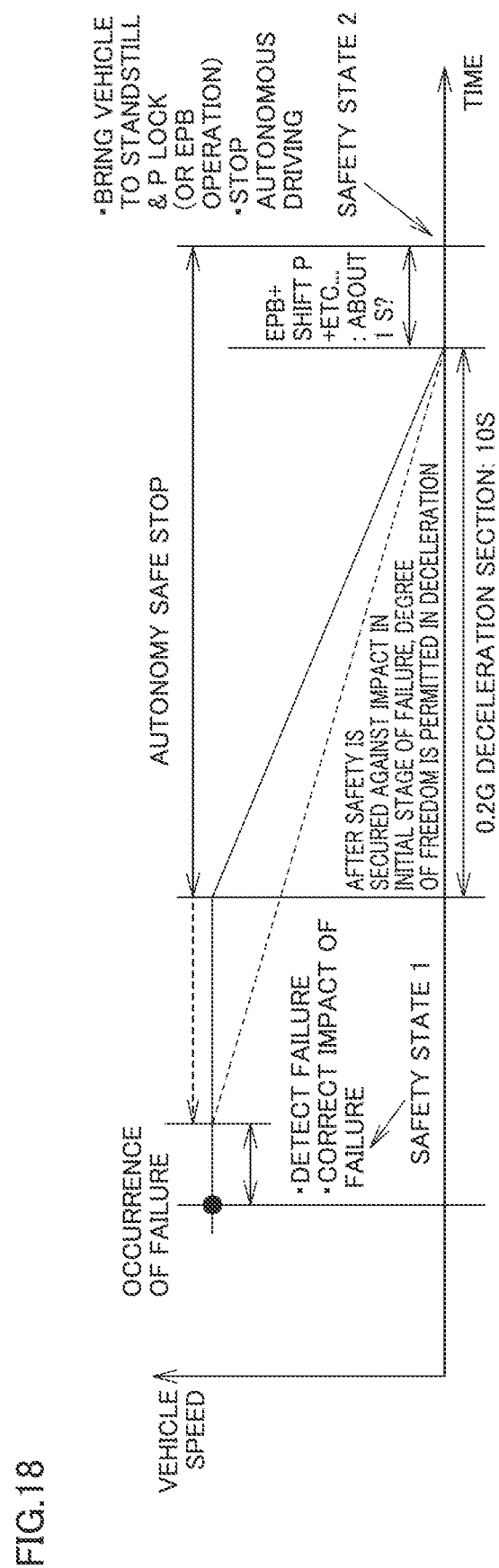
FIG. 18 is a diagram illustrating strategies until the vehicle is safely brought to a standstill at the time of occurrence of a failure.

The strategy of bringing the vehicle to a safe stop when a failure occurs is shown as follows (FIG. 18).

1. After occurrence of a failure, the entire vehicle executes "detecting a failure" and "correcting, an impact of failure" and then achieves the safety state 1.

2. Obeying the instructions from the ADS, the entire vehicle stops in a safe space at a safe speed (assumed less than 0.2 G).

However, depending on a situation, the entire vehicle should happen a deceleration more than the above deceleration if needed.

3. After stopping, in order to prevent slipping down, the entire vehicle achieves the safety state 2 by activating the immobilization system.

TABLE 107

| category | content |
|---|---|
| Precondition | Only one single failure at a time across the entire integrated vehicle. (Multiple failures are not covered) After the initial single failure, no other failure is anticipated in the duration in which the functionality is maintained. |
| Responsibility for the vehicle platform until safety state 2 | In case of a single failure, the integrated vehicle should maintain the necessary functionality for safety stop. The functionality should be maintained for 15 (fifteen) seconds. |
| Basic Responsibility Sharing | [For ADS] The ADS should create the driving plan, and should indicate vehicle control values to the VP. [For Toyota vehicle platform] The Toyota VP should control each system of the VP based on indications from the ADS. |

See the separated document called "Fault Management" regarding notifiable single failure and expected behavior for the ADS.

3.2. Redundancy

The redundant functionalities with Toyota's MaaS vehicle are shown.

Toyota's Vehicle Platform has the following redundant functionalities to meet the safety goals led from the functional safety analysis.

Redundant Braking

Any single failure on the Braking System doesn't cause loss of braking functionality. However, depending on where the failure occurred, the capability left might not be equivalent to the primary system's capability. In this case, the braking system is designed to prevent the capability from becoming 0.3 G or less.

Redundant Steering

Any single failure on the Steering System doesn't cause loss of steering functionality. However, depending on where the failure occurred, the capability left might not be equivalent to the primary systems capability. In this case, the steering system is designed to prevent the capability front becoming 0.3 G or less.

Redundant Immobilization

Toyota's MaaS vehicle has 2 immobilization systems, i.e. P lock and EPB. Therefore, any single failure of immobilization system doesn't cause loss of the immobilization capability. However, in the case of failure, maximum stationary slope angle is less steep than when the systems are healthy.

Redundant Power

Any single failure on the Power Supply System doesn't cause loss of power supply functionality. However, in case of the primary power failure, the secondary power supply system keeps supplying power to the limited systems for a certain time.

Redundant Communication

Any single failure on the Communication System doesn't cause loss of all the communication functionality. System which needs redundancy has physical redundant communication lines. For more detail information, see the chapter "Physical LAN architecture (in-Vehicle)".

4. Security Concept 4.1. Outline

Regarding security, Toyotas MaaS vehicle adopts the security document issued by Toyota as an upper document.

4.2. Assumed Risks

The entire risk includes not only the risks assumed on the base e-PF hut also the risks assumed for the Autono-MaaS vehicle.

The entire risk is shown as follows.

[Remote Attack]
To vehicle
　Spooling the center
　ECU Software Alternation
　DoS Attack
　Sniffering
From vehicle
　Spoofing the other vehicle
　Software Alternation for a center or an ECU on the other vehicle
　DoS Attack to a center or other vehicle
　Uploading illegal data
[Modification]
Illegal Reprogramming
Setting up an illegal ADK
installation of an unauthenticated product by a customer 4.3. Countermeasure for the Risks The countermeasure of the above assumed risks is shown as follows.

4.3.1. The Countermeasure for a Remote Attack

The countermeasure for a remote attack is shown as follows.

Since the autonomous driving kit communicates with the center of the operation entity, end-to-end security should be ensured. Since a function to provide a travel control instruction is performed, multi-layered protection in the autonomous driving kit is required. Use a secure microcomputer or a security chip in the autonomous driving kit and provide sufficient security measures as the first layer against access from the outside. Use another secure microcomputer and another security chip to provide security as the second layer. (Multi-layered protection in the autonomous driving kit including protection as the first layer to prevent direct entry from the outside and protection as the second layer as the layer below the former)

4.3.2. The Countermeasure for a Modification

The countermeasure for a modification is shown as follows.

For measures against a counterfeit autonomous driving kit, device authentication and message authentication are carried out, in storing a key, measures against tampering should be provided and a key set is changed for each pair of a vehicle and an autonomous driving, kit. Alternatively, the contract should stipulate that the operation entity exercise sufficient management so as not to allow attachment of an unauthorized kit. For measures against attachment of an unauthorized product by an Autono-MaaS vehicle user, the contract should stipulate that the operation entity exercise management not to allow attachment of an unauthorized kit.

In application to actual vehicles, conduct credible threat analysis together, and measures for addressing most recent vulnerability of the autonomous driving kit at the time of LO should be completed.

5. Function Allocation 5.1. In a Healthy Situation

Figure 19:
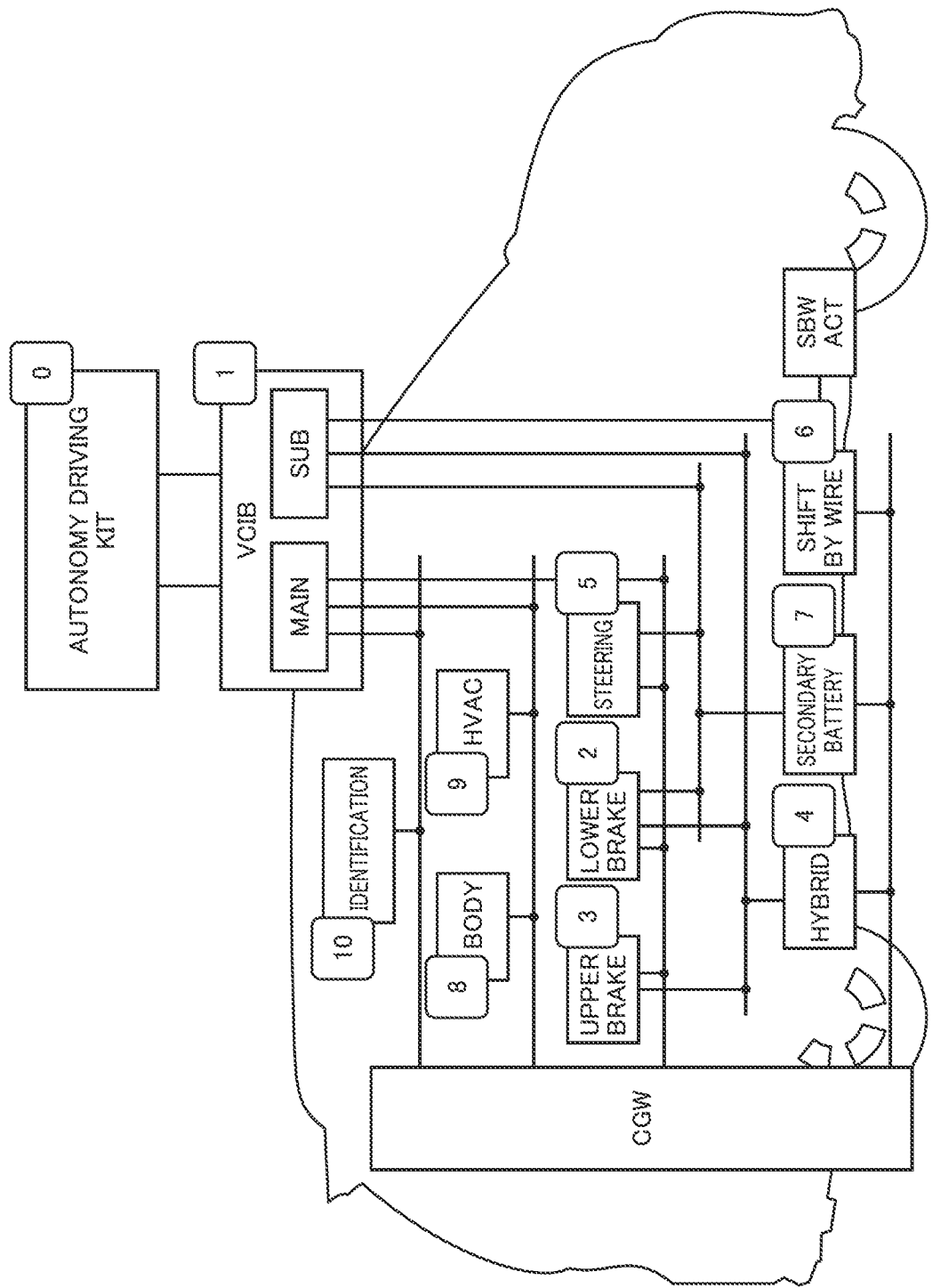
FIG. 19 is a diagram showing arrangement of representative functions of the vehicle.

The allocation of representative functionalities is shown as below (FIG. 19).

[Function Allocation]

TABLE 108

| Function category | Functon name | Related to # | remarks |
|---|---|---|---|
| Planning | Plan for driving path | 0 | |
| | Calculating control indications | 0 | e.g longitudinal G |
| Overall | API Pub/Sub | 1 | One system with redundancy |
| Security | Autonomy Driving Kit Authentication | 1 | One system with redundancy |
| | Message Authentication | 1 | One system with redundancy |
| | Door locking control | 8 | |
| Longitudinal/ Lateral | Motion control | 2 (Primary), 3 (Secondary) | |
| | Propulsion control | 4 | |
| | Braking control | 2, 3 | Two units controlled according to deceleration requirement |
| | Steering control | 5 | One system with redundancy |
| | Immobilization control | 2 (EPB), 6 (P Lock) | |
| | Shift control | 6 | |
| Power supply | Secondary battery control | 7 | |
| | Vehicle power control | 10 | For more information, see the API specification. |
| Access/Comfort | Body control | 8 | Turn signal, Headlight, Window, etc. |
| | HVAC control | 9 | |
| Data | Data logging (at event) | 1 | |
| | Data logging (constantly) | 1 | |

5.2. In a Single Failure

See the separated document called "Fault Management" regarding notifiable single failure and expected behavior for the ADS.

Though embodiments of the present disclosure have been described above, it should be understood that the embodiments disclosed herein are illustrative and non-restrictive in every respect. The scope of the present invention is defined by the terms of the claims and is intended to include any modifications within the scope and meaning equivalent to the terms of the claims.

What is claimed is:

1. A vehicle on which an autonomous driving system is mountable, the vehicle comprising:
a vehicle platform including circuitry that controls the vehicle in accordance with an instruction from the autonomous driving system; and
a vehicle control interface including circuitry that interfaces between the vehicle platform and the autonomous driving system, wherein
the vehicle control interface provides to the autonomous driving system, a signal indicating a moving direction of the vehicle that is determined based on a majority rule in connection with rotation directions of wheels.

2. The vehicle according to claim 1, wherein
when all wheel speed values are zero during a certain time period, the vehicle control interface provides to the autonomous driving system, a signal indicating "Standstill" as the signal indicating the moving direction of the vehicle.

3. The vehicle according to claim 1, wherein
when the number of wheels rotating in a forward rotation direction is larger than the number of wheels rotating in a reverse rotation direction, the vehicle control interface provides a signal indicating "Forward" to the autonomous driving system, and
when the number of wheels rotating in the reverse rotation direction is larger than the number of wheels rotating in the forward rotation direction, the vehicle control interface provides a signal indicating "Reverse" to the autonomous driving system.

4. The vehicle according to claim 1, wherein
when the number of wheels rotating in a forward rotation direction is equal to the number of wheels rotating in a reverse rotation direction, the vehicle control interface provides information indicating "Undefined" to the autonomous driving system.

5. A vehicle comprising:
an autonomous driving system that creates a driving plan;
a vehicle platform including circuitry that carries out vehicle control in accordance with an instruction from the autonomous driving system; and
a vehicle control interface including circuitry that interfaces between the vehicle platform and the autonomous driving system, wherein
the vehicle control interface provides to the autonomous driving system, a signal indicating a moving direction of the vehicle that is determined based on a majority rule in connection with rotation directions of wheels.

6. The vehicle according to claim 5, wherein
when all wheel speed values are zero during a certain time period, the vehicle control interface provides to the autonomous driving system, a signal indicating "Standstill" as the signal indicating the moving direction of the vehicle.

7. The vehicle according to claim 5, wherein
when the number of wheels rotating in a forward rotation direction is larger than the number of wheels rotating in a reverse rotation direction, the vehicle control interface provides a signal indicating "Forward" to the autonomous driving system, and
when the number of wheels rotating in the reverse rotation direction is larger than the number of wheels rotating in the forward rotation direction, the vehicle control interface provides a signal indicating "Reverse" to the autonomous driving system.

8. The vehicle according to claim 5, wherein
when the number of wheels rotating in a forward rotation direction is equal to the number of wheels rotating in a reverse rotation direction, the vehicle control interface provides information indicating "Undefined" to the autonomous driving system.

9. A method of controlling a vehicle on which an autonomous driving system is mountable, the vehicle including a vehicle platform including circuitry that controls the vehicle in accordance with an instruction from the autonomous driving system and a vehicle control interface including circuitry that interfaces between the vehicle platform and the autonomous driving system, the method comprising:
providing to the autonomous driving system, by the vehicle control interface, a signal indicating a moving direction of the vehicle that is determined based on a majority rule in connection with rotation directions of wheels.

10. The method of controlling a vehicle according to claim 9, further comprising providing to the autonomous driving system, by the vehicle control interface, a signal indicating "Standstill" as the signal indicating the moving direction of the vehicle when all wheel speed values are zero during a certain time period.

11. The method of controlling a vehicle according to claim 9, further comprising:
providing, by the vehicle control interface, a signal indicating "Forward" to the autonomous driving system when the number of wheels rotating in a forward rotation direction is larger than the number of wheels rotating in a reverse rotation direction, and
providing, by the vehicle control interface, a signal indicating "Reverse" to the autonomous driving system when the number of wheels rotating in the reverse rotation direction is larger than the number of wheels rotating in the forward rotation direction.

12. The method of controlling a vehicle according to claim 9, further comprising providing, by the vehicle control interface, information indicating "Undefined" to the autonomous driving system when the number of wheels rotating in a forward rotation direction is equal to the number of wheels rotating in a reverse rotation direction.

* * * * *